(12) United States Patent
Chen et al.

(10) Patent No.: US 12,425,931 B2
(45) Date of Patent: Sep. 23, 2025

(54) METHOD AND DEVICE FOR WIRELESS COMMUNICATION

(71) Applicant: BUNKER HILL TECHNOLOGIES LLC, Allen, TX (US)

(72) Inventors: Yu Chen, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 510 days.

(21) Appl. No.: 17/985,113

(22) Filed: Nov. 10, 2022

(65) Prior Publication Data
US 2023/0156535 A1    May 18, 2023

(30) Foreign Application Priority Data
Nov. 12, 2021 (CN) .......................... 202111336810.0

(51) Int. Cl.
*H04W 88/04* (2009.01)
*H04W 36/00* (2009.01)
*H04W 36/30* (2009.01)

(52) U.S. Cl.
CPC ....... *H04W 36/0058* (2018.08); *H04W 36/30* (2013.01)

(58) Field of Classification Search
CPC .............................. H04W 76/27; H04W 88/04
See application file for complete search history.

(56) References Cited

U.S. PATENT DOCUMENTS

2024/0251270 A1* 7/2024 Krishnan ............... H04W 76/27
2024/0373403 A1* 11/2024 Zhang ................... H04W 36/03

* cited by examiner

*Primary Examiner* — Barry W Taylor
(74) *Attorney, Agent, or Firm* — Ascenda Law Group, PC

(57) ABSTRACT

Disclosure a method and a device used for wireless communications, including receiving a first measurement configuration, the first measurement configuration comprising a first area configuration; in a first state, performing a first operation set; and determining according to the first state whether to perform measurement result logging based on the first area configuration; herein, the first operation set comprises: receiving paging via a first relay, and acquiring a first system information set via the first relay, and performing a re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; the present application can help optimize the network by receiving the first measurement configuration.

20 Claims, 7 Drawing Sheets

(a)

(b)

(a)

(b)

METHOD AND DEVICE FOR WIRELESS COMMUNICATION

CROSS REFERENCE TO RELATED APPLICATIONS

This application claims the priority benefit of Chinese Patent Application No. 202111336810.0, filed on Nov. 11, 2022, the full disclosure of which is incorporated herein by reference.

BACKGROUND

Technical Field

The present application relates to transmission methods and devices in wireless communication systems, in particular to a method and device for reducing traffic interruptions, enhancing traffic continuity and optimizing network measurement in sidelink relay communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications such as 38.304, 38.211, and 38.213, of which the details can refer to:
https://www.3gpp.org/ftp/Specs/archive/38_series/ 38.304/38304-g40.zip
https://www.3gpp.org/ftp/Specs/archive/38_series/ 38.211/38211-g50.zip
https://www.3gpp.org/ftp/Specs/archive/38_series/ 38.213/38213-g50.zip
https://www.3gpp.org/ftp/Specs/archive/38_series/ 38.331/38331-g50.zip

SUMMARY

The relay can be used in various communication scenarios, for instance, when a UE is not within coverage of a cell, it can be accessible to the network via the relay, where the relay node can be another UE. The relay generally includes L3 relay and L2 U2N relay, both of which provide the service of access to the network for a U2N remote UE via a relay node. The L3 relay is transparent to the access network, namely, a remote UE only establishes connection with the core network, so the access network cannot recognize whether data is from a remote node or a relay node; as for the L2 U2N relay, there is an RRC connection between a U2N remote UE and a Radio Access Network (RAN); the RAN can manage the remote UE and between them a radio bearer (RB) can be established. The relay can be another UE. In a system supporting L2 relay, the UE can be in communication with the network via a L2 U2N relay UE, that is, to use an indirect path, or can be directly in communication with the network without being relayed, that is, to use a direct path. In some cases, for example when the signal of network becomes weaker, a remote UE can switch from a direct path to an indirect path; after the signal gets better, it can then switch from the indirect path to a direct path. To provide better support for communications and improve service quality, the 5G system supports measuring in a non-RRC-connected state, i.e., RRC Idle state and RRC Inactive state; the UE measures in a non-RRC-connected mode, and will report the measurement in its next access to the network, and the network can be optimized based on such report. When not in the RRC connected mode, the UE may be camped normally or in any cell selection state or other state, and measurements required to be performed by the UE in different cases vary from each other. After introducing the L2 relay, the cases where the UE is not in an RRC connected state become more complicated, for example, the UE which is out of coverage may connect to the network via relay but the measurements commonly used for 5G are hardly adaptable to relay-using scenarios, or even worse, will cause misjudgment or missed detection. Thus, the problem to be solved in the present application includes how to design a method of effectively measuring and reporting in non-RRC-connected mode for networks using L2 relay.

To address the problem presented above, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first measurement configuration, the first measurement configuration comprising a first area configuration;

and performing a first operation set in a first state; and determining according to the first state whether to perform measurement result logging based on the first area configuration;

herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, a problem to be solved in the present application includes: how a remote UE that connects to the network via a L2 relay measures and reports when not in RRC connected state.

In one embodiment, an advantage of the above method includes that the UE can perform more accurate measurements for avoidance of missed detection, which optimizes the network performance and improve service quality as well as enhance network coverage.

Specifically, according to one aspect of the present application, the first candidate state is a camped normally state, the first condition set comprising that quality of cell on which the first node is camped does not satisfy a first quality criterion.

Specifically, according to one aspect of the present application, the first state set comprises a second candidate state; as a response to any condition in a second transition condition set being satisfied, the second candidate state can directly move to the connected mode; the second candidate state is a state other than being camped normally;

the phrase that the first state is used to determine whether to log measurement results based on the first area configuration includes: when the first state is the second candidate state, perform measurement result logging based on the first area configuration.

Specifically, according to one aspect of the present application, the first state set comprises a second candidate state; as a response to any condition in a second transition condition set being satisfied, the second candidate state can directly move to the connected mode;

the phrase that the first state is used to determine whether to log measurement results based on the first area configuration includes: when the first state is the second candidate state, perform measurement result logging and the action of performing measurement result logging is unrelated to the first area configuration.

Specifically, according to one aspect of the present application, the first state set comprises a second candidate state; as a response to any condition in a second transition condition set being satisfied, the second candidate state can directly move to the connected mode;

the phrase that the first state is used to determine whether to log measurement results based on the first area configuration includes: when the first state is the second candidate state, quality of a first cell is used to determine whether to perform measurement result logging based on the first area configuration;

herein, the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result logging is unrelated to the first area configuration.

Specifically, according to one aspect of the present application, starting a first timer as a response to receiving the first measurement configuration, where a value of the first timer is a first time length, the first measurement configuration comprising the first time length; and performing measurement result logging as a response to the first timer staying in a state of running.

Specifically, according to one aspect of the present application, as indicated by the first measurement configuration, a report type is event-triggered, and an event type is outOfCoverage.

Specifically, according to one aspect of the present application, performing measurement result logging, and adding first information in the measurement result logs, the first information being used for indicating at least one of a first state, receiving network information via relay, being out of coverage of a first cell, or the first relay.

Specifically, according to one aspect of the present application, performing measurement result logging, and adding an identity of a first cell in the measurement result logs, the first cell belonging to an area indicated by the first area configuration;

herein, the first cell is a serving cell when the first relay is not in an RRC connected state or a Primary Cell (PCell) when the first relay is in an RRC connected state. Specifically, according to one aspect of the present application, the first node is a UE.

Specifically, according to one aspect of the present application, performing measurement result logging, and adding an identity of a first cell in the measurement result logs, the first cell not belonging to an area indicated by the first area configuration;

herein, the first cell is a serving cell when the first relay is not in an RRC connected state or a Primary Cell (PCell) when the first relay is in an RRC connected state. Specifically, according to one aspect of the present application, the first node is a UE.

Specifically, according to one aspect of the present application, the first node is a terminal of Internet of Things (IoT).

Specifically, according to one aspect of the present application, the first node is a relay.

Specifically, according to one aspect of the present application, the first node is a U2N remote UE.

Specifically, according to one aspect of the present application, the first node is a vehicle-mounted terminal.

Specifically, according to one aspect of the present application, the first node is an aircraft.

The present application provides a method in a second node for wireless communications, comprising:
transmitting a first measurement configuration, the first measurement configuration comprising a first area configuration;
a receiver of the first measurement configuration, which is in a first state, performing a first operation set; and determining according to the first state whether to perform measurement result logging based on the first area configuration;
herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

Specifically, according to one aspect of the present application, the first candidate state is a camped normally state, the first condition set comprising that quality of cell on which the first node is camped does not satisfy a first quality criterion.

Specifically, according to one aspect of the present application, the first state set comprises a second candidate state; as a response to any condition in a second transition condition set being satisfied, the second candidate state can directly move to the connected mode; the second candidate state is a state other than being camped normally;
the phrase that the first state is used to determine whether to log measurement results based on the first area configuration includes: when the first state is the second candidate state, perform measurement result logging based on the first area configuration.

Specifically, according to one aspect of the present application, the first state set comprises a second candidate state; as a response to any condition in a second transition condition set being satisfied, the second candidate state can directly move to the connected mode;
the phrase that the first state is used to determine whether to log measurement results based on the first area configuration includes: when the first state is the second candidate state, perform measurement result logging and the action of performing measurement result logging is unrelated to the first area configuration.

Specifically, according to one aspect of the present application, the first state set comprises a second candidate state; as a response to any condition in a second transition condition set being satisfied, the second candidate state can directly move to the connected mode;
the phrase that the first state is used to determine whether to log measurement results based on the first area configuration includes: when the first state is the second candidate state, quality of a first cell is used to determine whether to perform measurement result logging based on the first area configuration;
herein, the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result logging is unrelated to the first area configuration.

Specifically, according to one aspect of the present application, the first measurement configuration is used for starting a first timer, where a value of the first timer is a first time length, the first measurement configuration comprising the first time length; a receiver of the first measurement configuration performs measurement result logging when the first timer is in a state of running.

Specifically, according to one aspect of the present application, as indicated by the first measurement configuration, a report type is event-triggered, and an event type is outOfCoverage.

Specifically, receiving a measurement result, the measurement result including first information, the first information being used for indicating at least one of a first state, receiving network information via relay, being out of coverage of a first cell, or the first relay.

Specifically, according to one aspect of the present application, receiving a measurement result, the measurement result including an identity of a first cell, the first cell belonging to an area indicated by the first area configuration;
herein, the first cell is a serving cell when the first relay is not in an RRC connected state or a Primary Cell (PCell) when the first relay is in an RRC connected state.

Specifically, according to one aspect of the present application, receiving a measurement result, the measurement result including an identity of a first cell, the first cell not belonging to an area indicated by the first area configuration;
herein, the first cell is a serving cell when the first relay is not in an RRC connected state or a Primary Cell (PCell) when the first relay is in an RRC connected state.

Specifically, according to one aspect of the present application, the second node is a base station.

Specifically, according to one aspect of the present application, the second node is a relay.

Specifically, according to one aspect of the present application, the second node is an aircraft.

Specifically, according to one aspect of the present application, the second node is a satellite.

Specifically, according to one aspect of the present application, the second node is an access-point device.

The present application provides a first node for wireless communications, comprising:
a first receiver, receiving a first measurement configuration, the first measurement configuration comprising a first area configuration;
the first receiver, which is in a first state, performing a first operation set; and determining according to the first state whether to perform measurement result logging based on the first area configuration;
herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

The present application provides a second node for wireless communications, comprising:
 a second transmitter, transmitting a first measurement configuration, the first measurement configuration comprising a first area configuration;
 a receiver of the first measurement configuration, which is in a first state, performing a first operation set; and determining according to the first state whether to perform measurement result logging based on the first area configuration;
 herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, compared with the prior art, the present application is advantageous in the following aspects:

Avoiding missed measurement, especially during measurements performed by a UE out of coverage which is connected to the network via relay and not in an RRC connected state.

The UE not in an RRC connected state, which is out of coverage and is connected to the network via relay, will be free from restrictions of area configuration, so that the measurement result is more sufficient and beneficial to further network optimization.

Any UE in a non-RRC-connected state other than any cell selection state and the camped normally state also supports the performance of measurement and corresponding reporting, adding more elements to the measurement result, thus enabling the network to have a better knowledge of the measurement result and to go deeper in analysis and network optimization.

Adding the connectivity of UE in the measurement result, e.g., whether the UE connects to the network via relay, which will contribute to the network optimization for relayed scenarios.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
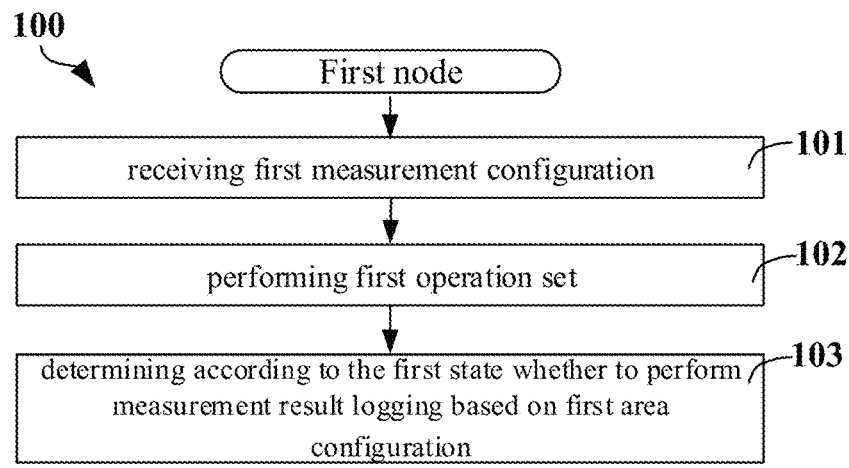
FIG. 1 illustrates a flowchart of receiving a first measurement configuration, performing a first operation set and determining according to a first state whether to perform measurement result logging based on a first area configuration according to one embodiment of the present application.

Embodiment 1 illustrates a flowchart of receiving a first measurement configuration, performing a first operation set and determining according to a first state whether to perform measurement result logging based on a first area configuration according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first measurement configuration in step 101; performs a first operation set in step 102; and determines according to a first state whether to perform measurement result logging based on a first area configuration in step 103;
 herein, the first measurement configuration comprising a first area configuration; the first node, which is in a first state, performs a first operation set; the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the first node is a User Equipment (UE).

In one embodiment, the first node is not running in an SNPN Access Mode (AM).

In one embodiment, a direct path refers to a UE-to-Network (U2N) transmission path, so transmitting through the direct path means that data is transmitted without being relayed between a remote UE and the network in U2N transmission.

In one subembodiment, the data comprises higher-layer data and signaling.

In one subembodiment, the data comprises an RRC signaling.

In one subembodiment, the data comprises a bit string or a bit block.

In one subembodiment, the data only comprises signaling or data borne by a radio bearer (RB).

In one embodiment, an indirect path refers to a UE-to-Network (U2N) transmission path, so transmitting through the indirect path means that data is forwarded by a U2N relay UE between a remote UE and the network in U2N transmission.

In one subembodiment, the data comprises higher-layer data and signaling.

In one subembodiment, the data comprises an RRC signaling.

In one subembodiment, the data comprises a bit string or a bit block.

In one subembodiment, the data only comprises signaling or data borne by a radio bearer (RB).

In one embodiment, a U2N relay UE refers to a UE providing the function of supporting connection between a U2N remote UE and the network.

In one embodiment, a U2N remote UE refers to a UE that needs to be relayed by a U2N relay UE in communications with the network.

In one embodiment, a U2N remote UE refers to a UE that needs to be relayed by a U2N relay UE in communications with the network.

In one embodiment, a U2N remote UE refers to a UE in communications with the network that supports relaying traffics.

In one embodiment, a U2N relay is a U2N relay UE.

In one embodiment, when transmitting to and receiving from the network unicast traffics, the U2N relay and the U2N remote node are both in an RRC connected state.

In one embodiment, when the U2N remote UE is in an RRC Idle state or an RRC Inactive state, the U2N relay UE can be in any RRC state, i.e., RRC Connected state, RRC Idle state or RRC Inactive state.

In one embodiment, not transmitting through a direct path is equivalent to transmitting through an indirect path.

In one embodiment, not transmitting through a direct path includes transmitting via a relay.

In one embodiment, transmitting through a direct path is or includes not transmitting via a relay.

In one embodiment, transmitting through a direct path is or includes not forwarding via a relay.

In one embodiment, the U2N relay UE is a UE providing the functionality of supporting connectivity to the network for the U2N remote UE.

In one subembodiment, the U2N relay UE is a UE.

In one subembodiment, the U2N relay UE provides the U2N remote UE with the service of relay to the network.

In one embodiment, the U2N remote UE is a UE in communication with the network via the U2N relay UE.

In one embodiment, a direct mode is a mode using the direct path.

In one embodiment, the direct mode is a mode in which a U2N remote UE is in communication with the network using the direct path.

In one embodiment, the direct mode is a mode in which a U2N remote UE transmits an RRC signaling or establishes an RRC connection to the network using the direct path.

In one embodiment, an indirect mode is a mode using the indirect path.

In one embodiment, the indirect mode is a mode using the indirect path.

In one embodiment, the indirect mode is a mode in which a U2N remote UE is in communication with the network using the indirect path.

In one embodiment, the indirect mode is a mode in which a U2N remote UE transmits an RRC signaling or establishes an RRC connection to the network using the indirect path.

In one embodiment, a serving cell is or includes a cell that the UE is camped on. Performing cell search includes that the UE searches for a suitable cell for a selected Public Land Mobile Network (PLMN) or a Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resumes a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a U2N remote node, a serving cell is or includes a cell which the U2N relay is camped on or is connected with.

In one embodiment, for a UE in RRC connected state without being configured with carrier aggregation/dual connectivity (CA/DC), there is only one serving cell that comprises a master cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with E-UTRA and an NR node, or between two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an sCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, an Access Stratum (AS) functionality that enables Vehicle-to Everything (V2X) communications defined in 3GPP TS 23.285 is V2X sidelink communication, where the V2X sidelink communication occurs between nearby UEs, using E-UTRA techniques but not traversing network nodes.

In one embodiment, an Access Stratum (AS) functionality that at least enables Vehicle-to Everything (V2X) communications defined in 3GPP TS 23.287 is NR sidelink communication, where the NR sidelink communication occurs between two or more nearby UEs, using NR technology but not traversing network nodes.

In one embodiment, the sidelink refers to a UE-to-UE direct communication link that uses sidelink resource allocation mode, a physical signal or channel, and physical layer procedures.

In one embodiment, not being or not located within coverage is equivalent to being out of coverage.

In one embodiment, being within coverage is equivalent to being covered.

In one embodiment, being out of coverage is equivalent to being uncovered.

In one embodiment, the first node is a U2N remote node.

In one embodiment, PDCP entities corresponding to radio bearers (RBs) terminated between a UE and the network are respectively located within the UE and the network.

In one embodiment, the direct path refers to a direct path or communication link or channel or bearer used for the direct-link transmission.

In one embodiment, the direct-path transmission means that data borne by at least one Signaling radio bearer (SRB) between the UE and network does not go through relaying or forwarding of other nodes.

In one embodiment, the direct-path transmission means that RLC bearers associated with at least one Signaling radio bearer (SRB) between the UE and network are respectively terminated at the UE and the network.

In one embodiment, the direct-path transmission means that RLC entities associated with at least one Signaling radio bearer (SRB) between the UE and network are respectively terminated at the UE and the network.

In one embodiment, the direct-path transmission means that there is a direct communication link between the UE and the network.

In one embodiment, the direct-path transmission means that there is a Uu interface between the UE and the network.

In one embodiment, the direct-path transmission means that there is a MAC layer of a Uu interface, and the MAC layer of the Uu interface carries an RRC signaling.

In one embodiment, the direct-path transmission means that there is a physical layer of a Uu interface between the UE and the network.

In one embodiment, the direct-path transmission means that there is a logical channel and/or a transport channel between the UE and the network.

In one embodiment, the indirect path refers to an indirect path or communication link or channel or bearer used for the indirect-link transmission.

In one embodiment, the indirect-path transmission means that at least Signaling radio bearer (SRB)-borne data between the UE and network goes through relaying or forwarding of other nodes.

In one embodiment, the indirect-path transmission means that at least Signaling radio bearer (SRB)-associated RLC bearers between the UE and network are respectively terminated at the UE and the other node, as well as the other node and the network.

In one embodiment, the indirect-path transmission means that at least Signaling radio bearer (SRB)-associated RLC entities between the UE and network are respectively terminated at the UE and the other node, as well as the other node and the network.

In one embodiment, the indirect-path transmission means that there is no direct communication link between the UE and the network.

In one embodiment, the indirect-path transmission means that there isn't a physical layer of a Uu interface between the UE and the network.

In one embodiment, the indirect-path transmission means that there isn't a physical layer of a Uu interface between the UE and the network.

In one embodiment, the indirect-path transmission means that there is neither a logical channel nor a transport channel between the UE and the network.

In one embodiment, the network includes a Radio Access Network (RAN) and/or a serving cell and/or a base station.

In one embodiment, the phrase of at least SRB includes at least one of {SRB0, SRB1, SRB2, SRB3}.

In one embodiment, the phrase of at least SRB includes both an SRB and a data radio bearer (DRB).

In one embodiment, the UE in the phrase of the UE and the network includes the first node.

In one embodiment, the other nodes include a relay node or other UE.

In one embodiment, when using a direct path for transmission, the UE can transmit a physical layer signaling to the network; when using an indirect path for transmission, the UE cannot transmit or directly transmit a physical layer signaling to the network.

In one embodiment, when using a direct path for transmission, the UE can transmit a MAC CE to the network; when using an indirect path for transmission, the UE cannot transmit or directly transmit a MAC CE to the network.

In one embodiment, when using a direct path for transmission, there isn't any other protocol layer between a PDCP layer and an RLC layer of the first node; when using an indirect path for transmission, there is at least one other protocol layer between a PDCP layer and an RLC layer of the first node.

In one subembodiment, the other protocol layer is or includes an adaption layer.

In one embodiment, when using a direct path for transmission, the network directly schedules uplink transmission of the first node via DCI; when using an indirect path for transmission, the network does not directly schedule uplink transmission of the first node via DCI.

In one embodiment, when using a direct path for transmission, an SRB of the first node is associated with an RLC entity and/or an RLC layer and/or an RLC bearer; when using an indirect path for transmission, an SRB of the first node is associated with an RLC entity of a PC5 interface.

In one embodiment, when using a direct path for transmission, a mapping relation exists between an SRB of the first node and an RLC entity of a Uu interface; when using an indirect path for transmission, a mapping relation exists between an SRB of the first node and an RLC entity of a PC5 interface.

In one embodiment, there only exists a direct path or an indirect path between the first node and the network.

In one embodiment, transiting from a direct path to an indirect path means: starting to use an indirect path and stopping using a direct path.

In one embodiment, transiting from a direct path to an indirect path means: starting to use an indirect path for transmission and stopping using a direct path for transmission.

In one embodiment, transiting from a direct path to an indirect path means: turning a direct-path transmission into an indirect-path transmission.

In one embodiment, transiting from a direct path to an indirect path means: the first node associates an SRB with an RLC entity of a PC5 interface and meanwhile releases an RLC entity of a Uu interface associated with the SRB.

In one embodiment, transiting from a direct path to an indirect path means: the first node associates an SRB and a DRB with an RLC entity of a PC5 interface and meanwhile releases an RLC entity of a Uu interface associated with the SRB and the DRB.

In one embodiment, the relay in the present application is a U2N relay UE.

In one embodiment, the relay in the present application is a L2 U2N relay UE.

In one embodiment, the first state is a camped normally state.

In one embodiment, the first state is not a camped normally state.

In one embodiment, the first state is a camped normally state via relay.

In one embodiment, the first state is an indirect camped state.

In one embodiment, names of the first state include relay.

In one embodiment, names of the first state include camp.

In one embodiment, names of the first state include indirect.

In one embodiment, names of the first state include L2.

In one embodiment, the first state is not a Connected mode.

In one embodiment, the first state is not camped on any cell.

In one embodiment, the any cell selection state is applied to states of RRC_IDLE and RRC_INACTIVE; in the any cell selection state, the UE shall perform a cell selection procedure to find a suitable cell, if no suitable cell is found in all UE-supported radio access technologies (RATs) and all bands through the cell selection procedure, and the UE is not in SNPN AM, the UE shall attempt to find an acceptable cell of any PLMN to camp on, that is, the UE shall make the attempt on all UE-supported RATs and search for high-quality cells in the first place.

In one subembodiment, the UE does not support L2 U2N relay.

In one subembodiment, the UE finds no suitable L2 U2N relay.

In one embodiment, if a UE is not camped on any cell, the UE shall be in the any cell selection state.

In one subembodiment, the UE finds no suitable L2 U2N relay.

In one subembodiment, the UE does not support L2 U2N relay.

In one embodiment, a UE in any cell selection state shall perform relay selection to find a suitable relay.

In one subembodiment, the relay is a L2 U2N relay.

In one embodiment, when the first node is in the first state, and any condition in the first condition set is satisfied, the first node transits from the first state to the connected mode.

In one subembodiment, the first node transmits from the first state to the connected mode without going through any other state.

In one embodiment, when the first node is in the first state, and any condition in the third condition set is satisfied, the first node transits from the first state to the any cell selection state.

In one subembodiment, the first node transmits from the first state to the any cell selection state without going through any other state.

In one subembodiment, the third condition set comprises: neither a suitable cell nor a suitable relay being found.

In one subembodiment, the third condition set comprises: neither a suitable cell nor a suitable L2 U2N relay UE being found.

In one embodiment, the first state can be directly switched to a connected mode.

In one embodiment, the first relay is a L2 U2N relay.

In one embodiment, the first relay is a U2N relay UE.

In one embodiment, the first relay is a UE.

In one embodiment, the first relay is a L2 U2N relay UE.

In one embodiment, the first relay is a L2 relay.

In one embodiment, any operation in the first operation set has a chance of being implemented.

In one embodiment, the action of listening over paging via a first relay includes that the first node indicates to the first relay an identity of the first node used for identifying the paging.

In one subembodiment, the identity used for identifying the paging includes a P-RNTI.

In one subembodiment, the identity used for identifying the paging includes an I-RNTI.

In one subembodiment, the identity used for identifying the paging includes a full I-RNTI.

In one subembodiment, the identity used for identifying the paging includes an ng-5G-S-TMSI.

In one subembodiment, the identity used for identifying the paging is included in a paging message for paging the first node transmitted by the base station.

In one subembodiment, the identity used for identifying the paging is included in a pagingRecord in a paging message for paging the first node transmitted by the base station.

In one embodiment, the action of listening over paging via a first relay includes that the first node indicates to the first relay a paging parameter of the first node.

In one subembodiment, the paging parameter includes paging periodicity.

In one subembodiment, the paging parameter includes periodicity of Discontinuous Reception (DRX).

In one subembodiment, the paging parameter includes a parameter used for determining a paging slot.

In one subembodiment, the paging parameter includes an offset used for determining a paging slot.

In one subembodiment, the paging parameter includes a random value used for determining a paging slot.

In one embodiment, the action of listening over a first system information set via the first relay includes receiving at least essential system information via the first relay.

In one subembodiment, the essential system information comprises at least partial bits or all bits comprised in a master information block (MIB).

In one subembodiment, the essential system information comprises at least partial bits or all bits comprised in a SIB1.

In one subembodiment, the essential system information comprises at least partial bits or all bits comprised in a SIB12.

In one subembodiment, the first system information set comprises the essential system information.

In one embodiment, the action of listening over a first system information set via the first relay includes that the first relay monitors a change of system information and forwards at least part of the latest system information to the first node.

In one embodiment, the action of listening over a first system information set via the first relay includes: the first node receiving system information forwarded by the first relay.

In one subembodiment, the first system information set comprises at least one system information block (SIB).

In one subembodiment, the action of receiving system information forwarded by the first relay includes receiving at least one SIB.

In one subembodiment, the first relay forwards the first system information set via a discovery message.

In one subembodiment, the first relay forwards the first system information set via a PC5-S message.

In one subembodiment, the first relay forwards the first system information set via a PC5-RRC message.

In one subembodiment, the first relay forwards the system information according to a SIB which the first node is interested in or requests as indicated by the first node, where the first system information set comprises the system information that the first node is interested in or requests.

In one subembodiment, upon reception of an indication of the first node about making a request for system information, the first relay makes a request for and/or receives the system information.

In one embodiment, the action of listening over a first system information set via the first relay includes: the first node receiving an indication transmitted by the first relay about the change to system information.

In one subembodiment, system information corresponding to the indication about the change to system information and the indication itself are simultaneously transmitted by the first relay.

In one subembodiment, the first node makes a request to the first relay for system information according to the indication about the change to system information.

In one subembodiment, the first node makes a request to the first relay for system information after receiving the indication about the change to system information.

In one embodiment, the first system information set comprises at least one SIB.

In one embodiment, the first system information set comprises at least partial bits in at least one SIB.

In one embodiment, the first system information set comprises all SIBs.

In one embodiment, the first system information set comprises any one of SIBs.

In one embodiment, the first system information set comprises all SIBs relating to transmissions using an indirect path.

In one embodiment, the first system information set comprises at least a SIB1.

In one embodiment, the first system information set comprises at least a SIB12.

In one embodiment, the first operation set comprises listening over a Short Message via the first relay.

In one subembodiment, the Short Message is not SMS.

In one subembodiment, a transmitter of the Short Message includes a cell or a base station, the Short Message being carried by downlink control information (DCI) when transmitted through a Uu interface.

In one subembodiment, the Short Message comprises 8 bits.

In one subembodiment, a second bit in the Short Message is used for indicating an alert.

In one subembodiment, a second bit in the Short Message is used for indicating the Earthquake and Tsunami Warning System (ETWS) and the Commercial Mobile Alert Service (CMAS).

In one subembodiment, a first bit in the Short Message does not indicate an alert.

In one subembodiment, a first bit in the Short Message indicates a change to system information.

In one subembodiment, a third bit in the Short Message indicates a stop of paging monitoring.

In one subembodiment, the first relay monitors the Short Message transmitted by a cell or a base station for the first node according to a P-RNTI of the first node.

In one embodiment, the first operation set does not comprise listening over a Short Message via the first relay.

In one subembodiment, the Short Message is not SMS.

In one embodiment, the first state is only applicable to RRC_IDLE and RRC_INACTIVE states.

In one embodiment, the first state is only applicable to a non-RRC-connected state, i.e., any state other than the RRC_CONNECTED state.

In one embodiment, the first operation set comprises performing a necessary measurement about cell selection and/or selection.

In one embodiment, the first operation set comprises performing a necessary measurement about relay selection and/or selection.

In one embodiment, cell selection/re-selection in the present application refers to cell selection and/or cell re-selection.

In one embodiment, cell selection/re-selection in the first state and the camped normally state refers to cell re-selection.

In one embodiment, cell selection/re-selection in the any cell selection state refers to cell selection.

In one embodiment, when using a L2 U2N relay, in the first state the first node can perform cell selection.

In one embodiment, when using a L2 U2N relay, in the first state the first node only performs cell selection rather than cell re-selection.

In one embodiment, when using a L2 U2N relay, in the camped normally state the first node can perform cell selection.

In one subembodiment, when using a L2 U2N relay, the first node only performs cell selection rather than cell re-selection in the camped normally state.

In one embodiment, when not using L2 U2N relay, the first node only performs cell re-selection in the camped normally state.

In one embodiment, the action of performing re-selection assessment includes performing a cell selection and/or re-selection procedure.

In one subembodiment, the triggering condition for performing the cell re-selection procedure includes internal triggering within the first node to meet the requirement of performance.

In one subembodiment, the triggering condition for performing the cell re-selection procedure includes receiving information about the change to the cell re-selection assessment procedure on a broadcast control channel (BCCH).

In one subembodiment, the triggering condition for performing the cell re-selection procedure includes receiving a message of failure of the first relay.

In one subembodiment, the triggering condition for performing the cell re-selection procedure includes receiving a message of radio link failure (RLF) of the first relay.

In one subembodiment, the triggering condition for performing the cell re-selection procedure includes receiving an indication of handover of the first relay.

In one subembodiment, the triggering condition for performing the cell re-selection procedure includes receiving an indication that a cell the first relay is camped on is unavailable.

In one subembodiment, the triggering condition for performing the cell re-selection procedure includes receiving an indication of no coverage of the first relay.

In one subembodiment, the triggering condition for performing the cell re-selection procedure includes receiving an indication of link release of the first relay.

In one subembodiment, the triggering condition for performing the cell re-selection procedure includes receiving an indication of the first relay being barred.

In one subembodiment, the triggering condition for performing the cell re-selection procedure includes receiving an indication from the first relay that the first relay enters any cell selection state.

In one subembodiment, an indication that the first relay enters a state of being camped on any cell is received from the first relay.

In one subembodiment, the triggering condition for performing the cell re-selection procedure includes that a link to the first relay is failed or released.

In one subembodiment, the triggering condition for performing the cell re-selection procedure includes that a link to the first relay cannot meet the QoS requirement.

In one subembodiment, the triggering condition for performing the cell re-selection procedure includes that a link to the first relay has quality lower than a threshold.

In one subembodiment, the triggering condition for performing the cell re-selection procedure includes that no message or feedback relating to keep alive message is received from the first relay.

In one subembodiment, the triggering condition for performing the cell re-selection procedure includes that the first relay is no longer suitable.

In one subembodiment, the triggering condition for performing the cell re-selection procedure includes that the first relay is no longer a suitable L2 U2N relay.

In one subembodiment, the triggering condition for performing the cell re-selection procedure includes that the cell on which the first node is camped is no longer suitable.

In one embodiment, the action of performing re-selection assessment includes performing a L2 U2N relay selection and/or re-selection procedure.

In one subembodiment, the triggering condition for performing a L2 U2N relay selection and/or re-selection procedure includes that the first relay is no longer a suitable L2 U2N relay.

In one subembodiment, the triggering condition for performing a L2 U2N relay selection and/or re-selection procedure includes that the current L2 U2N relay is no longer a suitable L2 U2N relay.

In one subembodiment, the triggering condition for performing a L2 U2N relay selection and/or re-selection procedure includes triggering due to internal factors of the first node.

In one subembodiment, the triggering condition for performing a L2 U2N relay selection and/or re-selection procedure includes that the cell on which the first node is camped is no longer suitable.

In one subembodiment, the triggering condition for performing a L2 U2N relay selection and/or re-selection procedure includes that the cell on which the first relay is camped is no longer suitable.

In one subembodiment, the triggering condition for performing a L2 U2N relay selection and/or re-selection procedure includes that the cell on which the first node is camped has quality lower than a threshold.

In one subembodiment, the triggering condition for performing a L2 U2N relay selection and/or re-selection procedure includes that a link between the first node and the first relay has quality lower than a threshold.

In one subembodiment, the triggering condition for performing a L2 U2N relay selection and/or re-selection procedure includes that the first node finds a suitable cell.

In one subembodiment, the triggering condition for performing a L2 U2N relay selection and/or re-selection procedure includes that the first node finds a cell whose quality is higher than a threshold.

In one subembodiment, the triggering condition for performing a L2 U2N relay selection and/or re-selection procedure includes that a link between the first node and the first relay is released or failed.

In one subembodiment, the triggering condition for performing a L2 U2N relay selection and/or re-selection procedure includes that the first relay indicates that the first node performs the L2 U2N relay selection or re-selection.

In one subembodiment, the triggering condition for performing a L2 U2N relay selection and/or re-selection procedure includes finding a L2 U2N relay with better signal quality.

In one subembodiment, the triggering condition for performing a L2 U2N relay selection and/or re-selection procedure includes that the first relay is barred.

In one subembodiment, the triggering condition for performing a L2 U2N relay selection and/or re-selection procedure includes that the first relay experiences a radio link failure (RLF).

In one subembodiment, the triggering condition for performing a L2 U2N relay selection and/or re-selection procedure includes that the first node transits from an RRC connected state.

In one subembodiment, the triggering condition for performing a L2 U2N relay selection and/or re-selection procedure includes that the first node transits from the connected mode.

In one subembodiment, the triggering condition for performing a L2 U2N relay selection and/or re-selection procedure includes that the first node enters any cell selection state.

In one subembodiment, the triggering condition for performing a L2 U2N relay selection and/or re-selection procedure includes that the first node enters a state of being camped on any cell.

In one subembodiment, the triggering condition for performing a L2 U2N relay selection and/or re-selection procedure includes arriving at a specific time.

In one subembodiment, the triggering condition for performing a L2 U2N relay selection and/or re-selection procedure includes entering a specific zone.

In one subembodiment, the triggering condition for performing a L2 U2N relay selection and/or re-selection procedure includes that a position relative to a specific reference point satisfies certain requirements.

In one subembodiment, the triggering condition for performing a L2 U2N relay selection and/or re-selection procedure includes that a position relative to two specific reference points satisfies certain requirements.

In one embodiment, the action of performing re-selection assessment includes a cell selection and/or re-selection assessment, as well as a L2 U2N relay selection and/or re-selection assessment.

In one subembodiment, when the first node finds a suitable cell but does not find any suitable L2 U2N relay, the first node then enters a camped normally state and is camped on the suitable cell found above.

In one subembodiment, when the first node finds no suitable cell but finds a suitable L2 U2N relay, the first node then enters the first state.

In one subembodiment, when the first node finds no suitable cell but finds a suitable L2 U2N relay, the first node then enters the first state and is camped on the suitable L2 U2N relay found above.

In one subembodiment, when the first node finds no suitable cell but finds a suitable L2 U2N relay, the first node then enters the first state and is camped on a PCell or serving cell of the suitable L2 U2N relay found above.

In one subembodiment, the first state is a camped normally state.

In one subembodiment, when the first node finds a suitable cell and also a suitable L2 U2N relay, then the first node selects from the suitable cell and the suitable L2 U2N relay according to its internal algorithm.

In one embodiment, a suitable L2 relay is a suitable L2 U2N relay.

In one embodiment, a suitable L2 relay is a relay that satisfies a second quality requirement.

In one subembodiment, the second quality requirement is or includes that a radio channel quality of a sidelink between the first node and a candidate relay is greater than or no less than a threshold.

In one subembodiment, the second quality requirement is or includes that a result of measuring an SL-RSRP is greater than or no less than a threshold.

In one subembodiment, the second quality requirement is or includes that a result of measuring an SD-RSRP is greater than or no less than a threshold.

In one subembodiment, the second quality requirement is for the quality of a radio channel between the first node and a candidate relay.

In one subembodiment, the second quality requirement is for the quality of a sidelink channel between the first node and a candidate relay.

In one subembodiment, the second quality requirement is for a result of measuring an SL-RSRP and/or SD-RSRP between the first node and a candidate relay.

In one embodiment, the suitable L2 relay is or includes a relay not being barred.

In one embodiment, the suitable L2 relay is or includes a L2 U2N relay.

In one embodiment, the suitable L2 relay is or includes a relay that is camped on what is a suitable cell.

In one embodiment, the suitable L2 relay is or includes: a relay of which a PCell is a suitable cell, the suitable relay being in an RRC connected state.

In one embodiment, the suitable L2 relay is or includes: a relay of which a serving cell is a suitable cell, the suitable relay being in an RRC connected state.

In one embodiment, the suitable L2 relay is or includes: a PCell belongs to a PLMN selected by the first node or registered by the first node or that belongs to an equivalent PLMN list, where the suitable relay is in an RRC connected state.

In one embodiment, the suitable L2 relay is or includes: a serving cell belongs to a PLMN selected by the first node or registered by the first node or that belongs to an equivalent PLMN list, where the suitable relay is in a non-RRC-connected state.

In one embodiment, the suitable L2 relay is or includes: a relay providing or capable of providing at least essential system information.

In one embodiment, the suitable L2 relay is or includes: a relay that meets the QoS requirement.

In one embodiment, the suitable L2 relay is or includes: a relay that conforms to the NAS requirement.

In one embodiment, the suitable L2 relay is or includes: a relay by which RSC indicated meets the requirement of L2 relay.

In one subembodiment, the relay service code (RSC) is used for finding a relay of 5G ProSe UE-to-Network (U2N), and for indicating the service of connection provided by the 5G ProSe U2N relay; the 5G ProSe U2N relay and 5G ProSe U2N remote UE can determine from the RSC whether to support a L2 or a L3 relay.

In one embodiment, the suitable L2 relay is or includes: a relay that establishes a PC5 connection.

In one embodiment, the suitable L2 relay is or includes: a relay that establishes a Direct link.

In one subembodiment, a PC5-S message used for establishing the direct link includes RSC.

In one subembodiment, establishing the direct link includes transmitting a DIRECT_COMMUNICATION_REQUEST message.

In one embodiment, the suitable L2 relay is or includes: a relay that receives system information from the suitable L2 relay.

In one embodiment, the suitable L2 relay is or includes: a relay that receives essential system information from the suitable L2 relay.

In one embodiment, the suitable L2 relay is or includes: a relay to which the first node indicates information about receiving paging.

In one embodiment, the suitable L2 relay is or includes: a relay to which the first node indicates information about receiving paging and by which the information is acknowledged.

In one embodiment, the suitable L2 relay is or includes: a relay with the capability of monitoring a paging message from the first node.

In one embodiment, the suitable L2 relay is or includes: a relay capable of monitoring a paging message from the first node.

In one embodiment, the suitable L2 relay is or includes: a relay capable of forwarding notification from the network.

In one embodiment, the suitable L2 relay is or includes: a relay in which no RLF occurs.

In one embodiment, the suitable L2 relay is or includes: a L2 U2N relay by which the SL-RSRP and/or SD-RSRP measured meets certain requirement.

In one subembodiment, the first node performs a measurement on a candidate relay to obtain the SL-RSRP and/or SD-RSRP.

In one subembodiment, a candidate relay performs a measurement on the first node to obtain the SL-RSRP and/or SD-RSRP.

In one embodiment, the suitable L2 relay is or includes: a L2 U2N relay by which the SL-RSRQ and/or SD-RSRQ measured meets certain requirement.

In one subembodiment, the first node performs a measurement on a candidate relay to obtain the SL-RSRQ and/or SD-RSRQ.

In one subembodiment, a candidate relay performs a measurement on the first node to obtain the SL-RSRQ and/or SD-RSRQ.

In one embodiment, the suitable L2 relay is or includes: a relay that does not receive an indication of releasing or rejecting a direct link.

In one embodiment, the suitable L2 relay is or includes: a relay to which a direct link is alive.

In one embodiment, the suitable L2 relay is or includes: a relay in a camped normally state or a relay in an RRC connected state.

In one embodiment, the phrase that an RRC connection is established includes establishing an RRC connection.

In one embodiment, the phrase that an RRC connection is established includes resuming an RRC connection.

In one embodiment, the phrase that an RRC connection is established includes re-establishing an RRC connection.

In one embodiment, when the RRC connection is established, the first node enters an RRC connected state.

In one embodiment, when the RRC connection is established, the first node is RRC connected with an access network.

In one embodiment, the action of listening over paging via a first relay includes receiving a paging message from a registered PLMN or SNPN.

In one embodiment, the phrase of registering and receiving a paging message from a PLMN or a SNPN includes initiating a registering procedure for the PLMN or the SNPN.

In one subembodiment, the registering procedure comprises transmitting a registration-related request of the NAS.

In one embodiment, the phrase of registering and receiving a paging message from a PLMN or a SNPN includes completing a registering procedure for the PLMN or the SNPN.

In one subembodiment, the registering procedure comprises transmitting a registration-related request of the NAS.

In one subembodiment, the registering procedure comprises receiving an allowed registration-related response of the NAS.

In one embodiment, the phrase of registering and receiving a paging message from a PLMN or a SNPN includes that the paging message from the PLMN or SNPN, after being transmitted to a serving cell or a base station, triggers that an air interface of the serving cell or base station transmits a paging message and/or paging-related DCI.

In one embodiment, the phrase of registering and receiving a paging message from a PLMN or a SNPN includes: receiving a paging message transmitted by a registered PLMN.

In one embodiment, the phrase of registering and receiving a paging message from a PLMN or a SNPN includes: receiving a paging message transmitted by a PLMN equivalent to a registered PLMN.

In one embodiment, the phrase of registering and receiving a paging message from a PLMN or a SNPN includes: performing a NAS registration procedure and receiving a paging message transmitted for the PLMN.

In one embodiment, the phrase of registering and receiving a paging message from a PLMN or a SNPN includes: being in a registered state, and receiving a paging message transmitted for the PLMN.

In one embodiment, the phrase of registering and receiving a paging message from a PLMN or a SNPN includes: being in a registered state for the NAS or core network, and receiving a paging message transmitted for the PLMN.

In one embodiment, the phrase of registering and receiving a paging message from a PLMN or a SNPN includes: receiving a paging message transmitted by a registered SNPN.

In one embodiment, the phrase of registering and receiving a paging message from a PLMN or a SNPN includes: receiving a paging message transmitted by a PLMN equivalent to a registered SNPN.

In one embodiment, the phrase of registering and receiving a paging message from a PLMN or a SNPN includes: performing a NAS registration procedure and receiving a paging message transmitted for the SNPN.

In one embodiment, the phrase of registering and receiving a paging message from a PLMN or a SNPN includes: being in a registered state, and receiving a paging message transmitted for the SNPN.

In one embodiment, the phrase of registering and receiving a paging message from a PLMN or a SNPN includes: being in a registered state for the NAS or core network, and receiving a paging message transmitted for the SNPN.

In one embodiment, a core network and an access network can have respective paging messages, unless otherwise emphasized that paging messages are from the core network or PLMN or SNPN, the paging messages in the present application refer to paging or paging messages of RAN side.

In one embodiment, a paging message from a PLMN or an SNPN comprises notification from the PLMN or SNPN.

In one embodiment, the first node is already registered in a first PLMN.

In one subembodiment, the first PLMN is any PLMN.

In one subembodiment, the first PLMN is a PLMN where a PCell of the first relay is located.

In one subembodiment, the first PLMN is a PLMN where a serving cell of the first relay is located.

In one subembodiment, the first PLMN is a PLMN where a cell on which the first relay is camped on is located.

In one subembodiment, the first PLMN is a PLMN where a cell on which the first node is camped on is located.

In one embodiment, the first node is already registered in an SNPN.

In one embodiment, moving from the first state to the connected mode is or includes beginning to switch from the first state to the connected mode.

In one embodiment, moving from the first state to the connected mode is or includes being switched to the connected mode from the first state.

In one embodiment, the phrase of moving from the first state to any cell selection state is or includes beginning to switch from the first state to the any cell selection state.

In one embodiment, the phrase of moving from the first state to any cell selection state is or includes being switched to the any cell selection state from the first state.

In one embodiment, the first state is the camped normally state.

In one subembodiment, the first condition set comprises one condition of finding a suitable cell.

In one embodiment, the first condition set comprises one condition of finding a suitable cell.

In one embodiment, the first state is a state other than being camped normally.

In one embodiment, the first state can move to the camped normally state, and/or, the camped normally state can move to the first state.

In one embodiment, the first quality standard in the present application is a criterion S.

In one embodiment, the first quality standard in the present application is:

Srxlev >0 and Squal >0;

Herein, the Srxlev is an RX level value of cell selection, measured in dB; the Squal is a quality value of cell selection, measured in dB.

In one subembodiment of the above embodiment:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

$Q_{rxlevmeas}$ given in the above two formulas is an RX level value of a measured cell, i.e., a Reference Signal Receiving Power (RSRP); $Q_{qualmeas}$ is a quality value of a measured cell, i.e., a Reference Signal Receiving Quality (RSRQ); other parameters provided in these formulas are either configured by the system, for instance by system information, or using their default values, e.g., 0.

In one embodiment, under the assumption of not using L2 relay, a suitable cell is a cell that satisfies the first quality criterion, namely, a suitable cell shall satisfy the first quality criterion; on the condition that a L2 relay is used, a suitable cell needn't meet the first quality criterion for the first node that serves as a L2 U2N remote node.

In one subembodiment, the phrase of not using L2 relay includes not supporting L2 U2N relay.

In one subembodiment, the phrase of not using L2 relay includes not finding a suitable L2 U2N relay.

In one subembodiment, on the condition that a L2 relay is used, a suitable cell of the first relay is considered to be a suitable cell of the first node.

In one subembodiment, the L2 relay is a L2 U2N relay.

In one subembodiment, on the condition that a L2 relay is used, a PCell of the first relay is considered to be a suitable cell of the first node.

In one subembodiment, on the condition that a L2 relay is used, a PCell of the first relay that meets the quality requirement is considered to be a suitable cell of the first node.

In one subembodiment, on the condition that a L2 relay is used, a serving cell of the first relay is considered to be a suitable cell of the first node.

In one subembodiment, on the condition that a L2 relay is used, a serving cell of the first relay that meets the quality requirement is considered to be a suitable cell of the first node.

In one subembodiment, on the condition that a L2 relay is used, the first node determines a suitable cell according to a second criterion, the second criterion comprising: the first relay being a suitable L2 relay, and the first cell is a suitable cell of the first relay.

In one subembodiment, on the condition that a L2 relay is used, the first node determines a suitable cell according to a second criterion, the second criterion comprising: the first cell not being barred.

In one subembodiment, on the condition that a L2 relay is used, the first node determines a suitable cell according to a second criterion, the second criterion comprising: the first cell belonging to a PLMN selected or registered by the first node or having equivalent properties.

In one subembodiment, on the condition that a L2 relay is used, the first node determines a suitable cell according to a second criterion, the second criterion comprising: a criterion other than the first quality criterion.

In one embodiment, under the assumption of not using L2 relay, a suitable cell is a cell that satisfies the first quality criterion, namely, a suitable cell shall satisfy the first quality criterion; on the condition that a L2 relay is used, a suitable cell needs to meet the first quality criterion as well for the first node that serves as a L2 U2N remote node.

In one embodiment, in the connected mode, the RRC connection is established via the first relay, or, the RRC connection is directly established without being relayed.

In one embodiment, the first node, as a response to satisfying at least one condition in a first cell re-selection condition set, performs cell re-selection assessment;

herein, the first cell re-selection condition set comprises: when information on a BCCH used for cell re-selection assessment changes, when the first relay is failed, and when channel quality of a first radio link is lower than a first threshold, as according to internal triggering within the first node; herein, the first radio link is a radio link between the first node and the first relay.

In one embodiment, the suitable L2 relay is or includes a relay not being barred.

In one embodiment, the suitable L2 relay is or includes a L2 U2N relay.

In one embodiment, the suitable L2 relay is or includes a relay that is camped on what is a suitable cell.

In one embodiment, the suitable L2 relay is or includes: a relay of which a PCell is a suitable cell, the suitable relay being in an RRC connected state.

In one embodiment, the suitable L2 relay is or includes: a relay of which a serving cell is a suitable cell, the suitable relay being in an RRC connected state.

In one embodiment, the suitable L2 relay is or includes: a PCell belongs to a PLMN selected by the first node or registered by the first node or that belongs to an equivalent PLMN list, where the suitable relay is in an RRC connected state.

In one embodiment, the suitable L2 relay is or includes: a serving cell belongs to a PLMN selected by the first node or registered by the first node or that belongs to an equivalent PLMN list, where the suitable relay is in a non-RRC-connected state.

In one embodiment, the suitable L2 relay is or includes: a relay providing or capable of providing at least essential system information.

In one embodiment, the suitable L2 relay is or includes: a relay providing or capable of providing, for example by forwarding, system information in a first system information set.

In one embodiment, the suitable L2 relay is or includes: a relay that meets the QoS requirement.

In one embodiment, the suitable L2 relay is or includes: a relay that conforms to the NAS requirement.

In one embodiment, the suitable L2 relay is or includes: a relay by which RSC indicated meets the requirement of L2 relay.

In one subembodiment, the relay service code (RSC) is used for finding a relay of 5G ProSe UE-to-Network (U2N), and for indicating the service of connection provided by the 5G ProSe U2N relay; the 5G ProSe U2N relay and 5G ProSe U2N remote UE can determine from the RSC whether to support a L2 or a L3 relay.

In one embodiment, the suitable L2 relay is or includes: a relay that establishes a PC5 connection.

In one embodiment, the suitable L2 relay is or includes: a relay that establishes a Direct link.

In one subembodiment, a PC5-S message used for establishing the direct link includes RSC.

In one subembodiment, establishing the direct link includes transmitting a DIRECT_COMMUNICATION_REQUEST message.

In one embodiment, the suitable L2 relay is or includes: a relay that receives system information from the suitable L2 relay.

In one embodiment, the suitable L2 relay is or includes: a relay that receives essential system information from the suitable L2 relay.

In one embodiment, the suitable L2 relay is or includes: a relay to which the first node indicates information about receiving paging.

In one embodiment, the suitable L2 relay is or includes: a relay to which the first node indicates information about receiving paging and by which the information is acknowledged.

In one embodiment, the suitable L2 relay is or includes: a relay with the capability of monitoring a paging message from the first node.

In one embodiment, the suitable L2 relay is or includes: a relay capable of monitoring a paging message from the first node.

In one embodiment, the suitable L2 relay is or includes: a relay capable of forwarding notification from the network.

In one embodiment, the suitable L2 relay is or includes: a relay in which no RLF occurs.

In one embodiment, the suitable L2 relay is or includes: a L2 U2N relay by which the SL-RSRP and/or SD-RSRP measured meets certain requirement.

In one subembodiment, the first node performs a measurement on a candidate relay to obtain the SL-RSRP and/or SD-RSRP.

In one subembodiment, a candidate relay performs a measurement on the first node to obtain the SL-RSRP and/or SD-RSRP.

In one embodiment, the suitable L2 relay is or includes: a L2 U2N relay by which the SL-RSRQ and/or SD-RSRQ measured meets certain requirement.

In one subembodiment, the first node performs a measurement on a candidate relay to obtain the SL-RSRQ and/or SD-RSRQ.

In one subembodiment, a candidate relay performs a measurement on the first node to obtain the SL-RSRQ and/or SD-RSRQ.

In one embodiment, the suitable L2 relay is or includes: a relay that does not receive an indication of releasing or rejecting a direct link.

In one embodiment, the suitable L2 relay is or includes: a relay to which a direct link is alive.

In one embodiment, the suitable L2 relay is or includes: a relay in a camped normally state or a relay in an RRC connected state.

In one embodiment, the phrase that an RRC connection is established includes establishing an RRC connection.

In one embodiment, the phrase that an RRC connection is established includes resuming an RRC connection.

In one embodiment, the phrase that an RRC connection is established includes re-establishing an RRC connection.

In one embodiment, when the RRC connection is established, the first node enters an RRC connected state.

In one embodiment, when the RRC connection is established, the first node is RRC connected with an access network.

In one embodiment, the action of listening over paging via a first relay includes receiving a paging message from a registered PLMN or SNPN.

In one embodiment, the phrase of registering and receiving a paging message from a PLMN or a SNPN includes initiating a registering procedure for the PLMN or the SNPN.

In one subembodiment, the registering procedure comprises transmitting a registration-related request of the NAS.

In one embodiment, the phrase of registering and receiving a paging message from a PLMN or a SNPN includes completing a registering procedure for the PLMN or the SNPN.

In one subembodiment, the registering procedure comprises transmitting a registration-related request of the NAS.

In one subembodiment, the registering procedure comprises receiving an allowed registration-related response of the NAS.

In one embodiment, the phrase of registering and receiving a paging message from a PLMN or a SNPN includes that the paging message from the PLMN or SNPN, after being transmitted to a serving cell or a base station, triggers that an air interface of the serving cell or base station transmits a paging message and/or paging-related DCI.

In one embodiment, the phrase of registering and receiving a paging message from a PLMN or a SNPN includes: receiving a paging message transmitted by a registered PLMN.

In one embodiment, the phrase of registering and receiving a paging message from a PLMN or a SNPN includes: receiving a paging message transmitted by a PLMN equivalent to a registered PLMN.

In one embodiment, the phrase of registering and receiving a paging message from a PLMN or a SNPN includes: performing a NAS registration procedure and receiving a paging message transmitted for the PLMN.

In one embodiment, the phrase of registering and receiving a paging message from a PLMN or a SNPN includes: being in a registered state, and receiving a paging message transmitted for the PLMN.

In one embodiment, the phrase of registering and receiving a paging message from a PLMN or a SNPN includes: being in a registered state for the NAS or core network, and receiving a paging message transmitted for the PLMN.

In one embodiment, the phrase of registering and receiving a paging message from a PLMN or a SNPN includes: receiving a paging message transmitted by a registered SNPN.

In one embodiment, the phrase of registering and receiving a paging message from a PLMN or a SNPN includes: receiving a paging message transmitted by a PLMN equivalent to a registered SNPN.

In one embodiment, the phrase of registering and receiving a paging message from a PLMN or a SNPN includes: performing a NAS registration procedure and receiving a paging message transmitted for the SNPN.

In one embodiment, the phrase of registering and receiving a paging message from a PLMN or a SNPN includes: being in a registered state, and receiving a paging message transmitted for the SNPN.

In one embodiment, the phrase of registering and receiving a paging message from a PLMN or a SNPN includes: being in a registered state for the NAS or core network, and receiving a paging message transmitted for the SNPN.

In one embodiment, a core network and an access network can have respective paging messages, unless otherwise emphasized that paging messages are from the core network or PLMN or SNPN, the paging messages in the present application refer to paging or paging messages of RAN side.

In one embodiment, a paging message from a PLMN or an SNPN comprises notification from the PLMN or SNPN.

In one embodiment, the first node is already registered in a first PLMN.

In one subembodiment, the first PLMN is any PLMN.

In one subembodiment, the first PLMN is a PLMN where a PCell of the first relay is located.

In one subembodiment, the first PLMN is a PLMN where a serving cell of the first relay is located.

In one subembodiment, the first PLMN is a PLMN where a cell on which the first relay is camped on is located.

In one subembodiment, the first PLMN is a PLMN where a cell on which the first node is camped on is located.

In one embodiment, the first node is already registered in an SNPN.

In one embodiment, moving from the first state to the connected mode is or includes beginning to switch from the first state to the connected mode.

In one embodiment, moving from the first state to the connected mode is or includes being switched to the connected mode from the first state.

In one embodiment, the phrase of moving from the first state to any cell selection state is or includes beginning to switch from the first state to the any cell selection state.

In one embodiment, the phrase of moving from the first state to any cell selection state is or includes being switched to the any cell selection state from the first state.

In one embodiment, the first state is the camped normally state.

In one subembodiment, the first condition set comprises one condition of finding a suitable cell.

In one embodiment, the first condition set comprises one condition of finding a suitable cell.

In one embodiment, the first state is a state other than being camped normally.

In one embodiment, the first state can move to the camped normally state, and/or, the camped normally state can move to the first state.

In one embodiment, under the assumption of not using L2 relay, a suitable cell is a cell that satisfies the first quality criterion, namely, a suitable cell shall satisfy the first quality criterion; on the condition that a L2 relay is used, a suitable cell needn't meet the first quality criterion for the first node that serves as a L2 U2N remote node.

In one subembodiment, the phrase of not using L2 relay includes not supporting L2 U2N relay.

In one subembodiment, the phrase of not using L2 relay includes not finding a suitable L2 U2N relay.

In one subembodiment, on the condition that a L2 relay is used, a suitable cell of the first relay is considered to be a suitable cell of the first node.

In one subembodiment, the L2 relay is a L2 U2N relay.

In one subembodiment, on the condition that a L2 relay is used, a PCell of the first relay is considered to be a suitable cell of the first node.

In one subembodiment, on the condition that a L2 relay is used, a PCell of the first relay that meets the quality requirement is considered to be a suitable cell of the first node.

In one subembodiment, on the condition that a L2 relay is used, a serving cell of the first relay is considered to be a suitable cell of the first node.

In one subembodiment, on the condition that a L2 relay is used, a serving cell of the first relay that meets the quality requirement is considered to be a suitable cell of the first node.

In one subembodiment, on the condition that a L2 relay is used, the first node determines a suitable cell according to a second criterion, the second criterion comprising: the first relay being a suitable L2 relay, and the first cell is a suitable cell of the first relay.

In one subembodiment, on the condition that a L2 relay is used, the first node determines a suitable cell according to a second criterion, the second criterion comprising: the first cell not being barred.

In one subembodiment, on the condition that a L2 relay is used, the first node determines a suitable cell according to a second criterion, the second criterion comprising: the first cell belonging to a PLMN selected or registered by the first node or having equivalent properties.

In one subembodiment, on the condition that a L2 relay is used, the first node determines a suitable cell according to a second criterion, the second criterion comprising: a criterion other than the first quality criterion.

In one embodiment, under the assumption of not using L2 relay, a suitable cell is a cell that satisfies the first quality criterion, namely, a suitable cell shall satisfy the first quality criterion; on the condition that a L2 relay is used, a suitable cell needs to meet the first quality criterion as well for the first node that serves as a L2 U2N remote node.

In one embodiment, in the connected mode, the RRC connection is established via the first relay, or, the RRC connection is directly established without being relayed.

In one embodiment, the first node, as a response to satisfying at least one condition in a first cell re-selection condition set, performs cell re-selection assessment;

herein, the first cell re-selection condition set comprises: when information on a BCCH used for cell re-selection assessment changes, when the first relay is failed, and when channel quality of a first radio link is lower than a first threshold, as according to internal triggering within the first node; herein, the first radio link is a radio link between the first node and the first relay.

In one embodiment, the system information comprises at least one of a SIB1, a SIB12 or a MIB.

In one embodiment, the first measurement configuration is or includes a configuration about measurement.

In one embodiment, the first measurement configuration is or includes a configuration about measurement report.

In one embodiment, the first measurement configuration is or includes a configuration about measurement result logging.

In one embodiment, the first measurement configuration is transmitted using an SRB1.

In one embodiment, the first measurement configuration is used for performing measurement result logging in an RRC_IDLE or RRC_INACTIVE state.

In one embodiment, the first measurement configuration is used for transmitting recorded measurement result for use of network optimization.

In one embodiment, the first measurement configuration comprises a tracereference.

In one subembodiment, the first node includes the tracereference when reporting the recorded measurement result to the network.

In one embodiment, the first measurement configuration comprises absoluteTimeInfo.

In one subembodiment, the absoluteTimeInfo comprises 48 bits.

In one subembodiment, the format of the absoluteTimeInfo is YY-MM-DD HH:MM:SS.

In one embodiment, the first measurement configuration comprises a plmn-IdentityList for indicating a PLMN list.

In one embodiment, the first measurement configuration comprises a bt-NameList for indicating the name of bluetooth beacons so as to configure measurement on bluetooth.

In one embodiment, the first measurement configuration comprises a wlan-NameList for indicating the name of WLAN AP so as to configure measurement on WLAN.

In one embodiment, the first measurement configuration comprises a sensor-NameList for indicating the name of a sensor so as to configure measurement on the sensor.

In one embodiment, the first measurement configuration comprises a loggingDuration for indicating a time length of measuring result logging, e.g., a record of 20 minutes of measurement result.

In one embodiment, the first measurement configuration comprises a report type, the report type including periodic and event-triggered.

In one embodiment, the first measurement configuration is an RRC message.

In one embodiment, the first measurement configuration is LoggedMeasurementConfiguration.

In one embodiment, the first measurement configuration is measConfig.

In one embodiment, the first measurement configuration is measObjectNR.

In one embodiment, the first area configuration is areaConfig.

In one embodiment, the first area configuration comprises downlink carrier nearby frequency.

In one embodiment, the first area configuration comprises a cell list indicated by a physical cell identity.

In one embodiment, the first area configuration comprises an interFreqTargetList.

In one embodiment, the first area configuration comprises a CellGlobalIdList indicated by a CGI.

In one subembodiment, the CGI refers to Cell Global Identity.

In one embodiment, the first area configuration comprises a tracking area code list.

In one embodiment, the first area configuration comprises a tracking area ID list.

In one subembodiment, the tracking area ID comprises a PLMN Identity and a tracking area code.

In one embodiment, the first area configuration is AreaConfiguration.

In one embodiment, the first area configuration is areaConfig.

In one embodiment, the phrase that in the connected mode an RRC connection is established means that in the connected mode, the first node is in an RRC connected state.

In one embodiment, the phrase that in the connected mode an RRC connection is established means that entering the connected mode, the first node will initiate a procedure of RRC establishment.

In one embodiment, the phrase that in the connected mode an RRC connection is established means that when entering the connected mode, the first node has completed a procedure of RRC establishment.

In one embodiment, the phrase that the first candidate state can directly move to a connected mode means that: the first candidate state needn't go through any other intermediate state before switching to the connected mode.

In one embodiment, the phrase that the first candidate state can directly move to a connected mode means that: the first candidate state needn't go through a cell re-selection assessment procedure before switching to the connected mode.

In one embodiment, the phrase that the first candidate state can directly move to a connected mode means that: the first candidate state needn't be camped normally before switching to the connected mode, the first state not being camped normally.

In one embodiment, the phrase that the first candidate state can directly move to a connected mode means that: the first candidate state needn't go through any cell selection before switching to the connected mode.

In one embodiment, the phrase that the first candidate state can directly move to a connected mode means that: the first candidate state needn't be camped on any cell before switching to the connected mode.

In one embodiment, the phrase that the first candidate state can directly move to a connected mode means that: the first candidate state needn't go through a cell selection state before switching to the connected mode.

In one embodiment, the first candidate state is being camped normally.

In one embodiment, the first candidate state is being camped normally via relay.

In one embodiment, the first candidate state is being camped via relay.

In one embodiment, the first candidate state is being relay-connected.

In one embodiment, the first candidate state is being relay-camped.

In one embodiment, the first candidate state is being indirectly camped.

In one embodiment, the first candidate state is being indirectly camped normally.

In one embodiment, names of the first candidate state include relay.

In one embodiment, names of the first candidate state include indirect.

In one embodiment, names of the first candidate state include L2.

In one embodiment, names of the first candidate state include camp.

In one embodiment, names of the first candidate state include connect.

In one embodiment, names of the first candidate state include access.

In one embodiment, names of the first candidate state include ooc.

In one embodiment, names of the first candidate state include outofcoverage.

In one embodiment, names of the first candidate state include second.

In one embodiment, the first transition condition set comprises or only comprises that NAS indicates a need for establishing an RRC connection.

In one embodiment, the first transition condition set comprises or only comprises transiting from an idle or inactive mode.

In one embodiment, the first transition condition set comprises or only comprises that paging is received.

In one embodiment, the first transition condition set comprises or only comprises that a first specific timer is expired.

In one subembodiment, the first specific timer is or includes T319.

In one subembodiment, the first specific timer is or includes T319a.

In one subembodiment, the first specific timer is or includes T319b.

In one subembodiment, the first specific timer is or includes T329.

In one subembodiment, the first specific timer is or includes T419.

In one embodiment, the first transition condition set comprises or only comprises a service request.

In one embodiment, the first transition condition set comprises or only comprises a registration request.

In one embodiment, the first transition condition set comprises or only comprises that system information is received.

In one embodiment, the first transition condition set comprises or only comprises performing measurement result reporting.

In one embodiment, the first condition set comprises finding a suitable cell.

In one embodiment, the first condition set comprises not finding any suitable cell.

In one embodiment, the first condition set comprises finding a suitable relay.

In one embodiment, the first condition set comprises not finding any suitable relay.

In one embodiment, the first condition set comprises not being camped on a suitable cell.

In one embodiment, the first condition set comprises connecting to the network via relay.

In one embodiment, the first condition set comprises connecting to the network via a L2 U2N relay UE.

In one embodiment, the first condition set comprises being camped on the network via a L2 U2N relay UE.

In one embodiment, the action of performing measurement result logging includes logging (a) measurement result(s).

In one embodiment, the action of performing measurement result logging includes a set of moves.

In one subembodiment, upon reception of the first measurement configuration, the first node stores at least part of or all the first measurement configuration in a first variable.

In one subembodiment, upon reception of the first measurement configuration, the first node stores at least one field or all fields of the first measurement configuration in a first variable.

In one subembodiment, upon reception of the first measurement configuration, the first node stores at least one Information Element (IE) or all IEs of the first measurement configuration in a first variable.

In one subembodiment, the first variable is VarLogMeasConfig.

In one subembodiment, when a report type in the first variable is periodical, if the first node is in any cell selection state, logging is performed at even time intervals.

In one subembodiment, when a report type in the first variable is periodical, if the first node is camped normally and the first condition set is satisfied, logging is performed at even time intervals.

In one subembodiment, when a report type in the first variable is periodical, if the first node is in the first state, logging is performed at even time intervals.

In one subembodiment, when a report type in the first variable is periodical, if the first node is in the first state and at least one condition in the first condition set is satisfied, logging is performed at even time intervals.

In one subembodiment, when a report type in the first variable is periodical, if the first node is in the first state and the present cell is a cell indicated by a first area configuration, logging is performed at even time intervals.

In one subembodiment, when a report type in the first variable is eventTriggered, if the first node is in any cell selection state, logging is performed at even time intervals.

In one subembodiment, when a report type in the first variable is eventTriggered, if the first node is in the first state, logging is performed at even time intervals.

In one subembodiment, when a report type in the first variable is eventTriggered, if the first node is in the first state and the first condition set is satisfied, logging is performed at even time intervals.

In one subembodiment, when a report type in the first variable is eventTriggered, if the first node is in the first state and no suitable cell is found, logging is performed at even time intervals.

In one subembodiment, when a report type in the first variable is eventTriggered, as the first node transits from any cell selection state to being camped normally, and an RPLMN of the first node belongs to a plmn-IdentityList in the first variable, with the first condition set being satisfied, logging is performed.

In one subembodiment, when a report type in the first variable is eventTriggered, as the first node transits from any cell selection state to the first state, and an RPLMN of the first node belongs to a plmn-IdentityList in the first variable, logging is performed.

In one embodiment, the phrase that the action of performing measurement result logging is unrelated to the first area configuration means that: the first area configuration can be assumed to be unconfigured as the action of performing measurement result logging is taken.

In one embodiment, the phrase that the action of performing measurement result logging is unrelated to the first area configuration means that: the action of performing measurement result logging is the same as performing measurement result logging with the first area configuration unconfigured.

In one embodiment, the phrase that the action of performing measurement result logging is unrelated to the first area configuration means that: no matter what is contained in the first area configuration, the action of performing measurement result logging is the same.

In one embodiment, the phrase that the action of performing measurement result logging is unrelated to the first area configuration means that: no matter what is contained in the first area configuration, the content logged by the action of performing measurement result logging is the same.

In one embodiment, the phrase that the action of performing measurement result logging is unrelated to the first area configuration means that: measurement result logging is not performed based on the first area configuration.

In one embodiment, the phrase that the action of performing measurement result logging is unrelated to the first area configuration means that: whether or not a serving cell of the first node belongs to an area indicated by the first area configuration, the first node performs measurement result logging.

In one embodiment, as a response to receiving the first measurement configuration, the first node stores the first area configuration in a first variable.

In one subembodiment, the first variable is VarLogMeasConfig.

In one embodiment, an Information Element (IE) in the first measurement configuration in the present application not only refers to an IE in a message but also refers to a corresponding IE with a same name stored in the first variable.

In one embodiment, the first area configuration in the present application not only refers to an IE in the first measurement configuration but also refers to a corresponding IE with a same name stored in the first variable.

In one embodiment, the meaning of the phrase of determining according to the first state whether to perform measurement result logging based on the first area configuration includes or only includes: determining to perform measurement result logging based on the first area configuration according to the first state, or determining not to perform measurement result logging based on the first area configuration according to the first state.

In one embodiment, the meaning of the phrase of determining according to the first state whether to perform measurement result logging based on the first area configuration is: determining according to the first state: whether to perform measurement result logging based on the first area configuration or not to perform measurement result logging based on the first area configuration.

In one embodiment, the meaning of the phrase of determining according to the first state whether to perform measurement result logging based on the first area configuration is: determining according to the first state: whether to perform measurement result logging based on the first area configuration, or that performing measurement result logging is unrelated to the first area configuration.

In one embodiment, the first state can only be one state in the first state set.

In one embodiment, the first state is one state in the first state set.

In one embodiment, the first state is one of all candidate states in the first state set.

In one embodiment, the first candidate state is a camped normally state, the first condition set comprising that quality of cell on which the first node is camped does not satisfy a first quality criterion.

In one subembodiment, the first condition set only comprises that the quality of a cell on which the first node is camped does not meet the first quality criterion.

In one subembodiment, the first quality standard is criterion S.

In one subembodiment, a suitable cell is a cell that satisfies the first quality criterion.

In one subembodiment, in a case where a direct path is used, a suitable cell is a cell that satisfies the first quality criterion.

In one subembodiment, when connecting to a cell not via relay, a suitable cell is a cell that satisfies the first quality criterion.

In one subembodiment, quality of a serving cell meeting the first quality criterion means that the quality of the serving cell is higher than a threshold.

In one subembodiment, quality of a serving cell meeting the first quality criterion means that a measurement result of the serving cell is higher than a threshold.

In one subembodiment, quality of a serving cell meeting the first quality criterion means that a measurement result of RSRP of the serving cell is higher than a threshold.

In one subembodiment, the cell on which the first node is camped is a suitable cell.

In one subembodiment, the cell on which the first node is camped is a not suitable cell.

In one subembodiment, the cell on which the first node is camped is a suitable cell of the first relay.

In one subembodiment, the cell on which the first node is camped is a cell served by the first relay.

In one subembodiment, the cell on which the first node is camped is a serving cell of the first relay and the first relay is not in an RRC connected state.

In one subembodiment, the cell on which the first node is camped is a PCell of the first relay and the first relay is in an RRC connected state.

In one subembodiment, the cell on which the first node is camped is a cell camped via the first relay.

In one subembodiment, the cell on which the first relay is camped is a camped cell of the first node.

In one subembodiment, the camped cell of the first relay is a camped cell of the first node.

In one subembodiment, the first node performs the first operation set for the cell on which the first node is camped in the first state.

In one embodiment, the first candidate state is a state other than being camped normally, the first condition set comprising or only comprising that quality of cell on which the first node is camped does not satisfy a first quality criterion.

In one embodiment, the first candidate state is a state other than being camped normally, when no condition in the first condition set is being satisfied, the first node performs measurement result logging based on the first area configuration.

In one subembodiment, the first condition set comprises or only comprises that the quality of a cell on which the first node is camped does not meet a first quality criterion.

In one subembodiment, the first condition set comprises or only comprises that the first candidate state is related to relay.

In one subembodiment, the first condition set comprises or only comprises that names of the first candidate state include relay.

In one subembodiment, the first condition set comprises or only comprises that the first candidate state is not being camped normally.

In one subembodiment, the first state is the first candidate state.

In one subembodiment, quality of a cell on which the first node is camped does not meet a first quality criterion.

In one subembodiment, quality of a cell on which the first node is camped meets a first quality criterion.

In one subembodiment, quality of a cell on which the first node is camped refers to a cell served by the first relay.

In one subembodiment, the action of performing measurement result logging based on the first area configuration includes that if the cell on which the first node is camped is within an area indicated by the first area configuration, a result of measuring the cell on which the first node is camped is included in the measurement result logs, otherwise, the result of measuring the cell on which the first node is camped is not included in the measurement result logs.

In one embodiment, the first measurement configuration comprises an identity of the first relay.

In one subembodiment, the identity of the first relay is a Layer-2 ID.

In one subembodiment, the identity of the first relay is a link-layer identity.

In one subembodiment, the first condition set is or includes that the first candidate state is a relay-based state.

In one subembodiment, the first condition set is or includes that the first candidate state is being camped normally.

In one subembodiment, the first condition set is or includes that the first candidate state is a state unrelated to relay.

In one subembodiment, the first condition set is or includes that the first candidate state is not being camped normally.

In one subembodiment, the action of performing measurement result logging based on the first area configuration includes that when the first relay is indicated by the first measurement configuration, the first relay is considered to be belonging to the first area, and the measurement result logs include a measurement result of the first relay or a measurement result of at least one serving cell of the first relay.

In one subembodiment, the action of performing measurement result logging based on the first area configuration includes that when the first relay is not indicated by the first measurement configuration, the first relay is considered to be not belonging to the first area, and the measurement result logs do not include a measurement result of the first relay.

In one subembodiment, the action of performing measurement result logging based on the first area configuration includes that when the first relay is not indicated by the first measurement configuration, the first relay is considered to be not belonging to the first area, and the measurement result logs do not include a measurement result of a serving cell of the first relay.

In one embodiment, the first condition set comprises or only comprises that the first candidate state is related to relay.

In one embodiment, the first condition set comprises or only comprises that the first candidate state is a state other than the camped normally state.

In one embodiment, the second candidate state is not being camped normally.

In one embodiment, the second candidate state is being camped via relay.

In one embodiment, the second candidate state is being camped normally via relay.

In one embodiment, the second candidate state is a relay-based state.

In one embodiment, the second candidate state is the first candidate state.

In one subembodiment, the first state set only comprises one element, the element being the first candidate state and the second candidate state.

In one embodiment, the second candidate state and the first candidate state are a same candidate state.

In one subembodiment, the first state set only comprises one element, the element being the first candidate state and the second candidate state.

In one embodiment, the first state set comprises a second candidate state; as a response to any condition in a second transition condition set being satisfied, the second candidate state can directly move to the connected mode; the second candidate state is a state other than being camped normally;

the phrase that the first state is used to determine whether to log measurement results based on the first area configuration includes: when the first state is the second candidate state, perform measurement result logging based on the first area configuration.

In one subembodiment, the second candidate state is being camped via relay.

In one subembodiment, the second candidate state is being relay-connected.

In one subembodiment, the second candidate state is being relay-camped.

In one subembodiment, the second candidate state is being indirectly camped.

In one subembodiment, the second candidate state is being indirectly camped normally.

In one subembodiment, names of the second candidate state include relay.

In one subembodiment, names of the second candidate state include indirect.

In one subembodiment, names of the second candidate state include L2.

In one subembodiment, names of the second candidate state include camp.

In one subembodiment, names of the second candidate state include connect.

In one subembodiment, names of the second candidate state include access.

In one subembodiment, the second candidate state and the first candidate state are different.

In one subembodiment, the second candidate state and the first candidate state are a same candidate state.

In one subembodiment, the second candidate state and the first candidate state are a same candidate state, and neither the second candidate state nor the first candidate state is being camped normally.

In one subembodiment, the second transition condition set comprises or only comprises that NAS indicates a need for establishing an RRC connection.

In one subembodiment, the second transition condition set comprises or only comprises transiting from an idle or inactive mode.

In one subembodiment, the second transition condition set comprises or only comprises that paging is received.

In one subembodiment, the second transition condition set comprises or only comprises that a first specific timer is expired.

In one subembodiment, the second transition condition set comprises or only comprises that a first specific timer is expired, where the first specific timer is one of T319, T319a, T319b, T329, or T429.

In one subembodiment, the phrase that the second candidate state can directly move to the connected mode means that the second candidate state needn't go through any other intermediate state before switching to the connected mode.

In one subembodiment, the phrase that the second candidate state can directly move to the connected mode means that the second candidate state doesn't go through any other intermediate state before switching to the connected mode.

In one subembodiment, the first condition set comprises or only comprises that: the first state is the second candidate state.

In one subembodiment, the phrase that as a response to any condition in a second transition condition set being satisfied, the second candidate state can directly move to the connected mode means that when the first node is in the second candidate state, if any condition in the second transition condition set is satisfied, the first node directly moves from the second candidate state to the connected mode and the action of moving to the connected mode does not go through any other intermediate state.

In one subembodiment, the phrase that as a response to any condition in a second transition condition set being satisfied, the second candidate state can directly move to the connected mode means that if any condition in the second transition condition set is satisfied, the second candidate state moves directly to the connected mode.

In one embodiment, the first state set comprises a second candidate state; as a response to any condition in a second transition condition set being satisfied, the second candidate state can directly move to the connected mode; the second candidate state is a state other than being camped normally; the phrase that the first state is used to determine whether to log measurement results based on the first area configuration includes: the first state being the second candidate state, the first node performs measurement result logging based on the first area configuration.

In one subembodiment, the second candidate state is being camped via relay.

In one subembodiment, the second candidate state is being relay-connected.

In one subembodiment, the second candidate state is being relay-camped.

In one subembodiment, the second candidate state is being indirectly camped.

In one subembodiment, the second candidate state is being indirectly camped normally.

In one subembodiment, names of the second candidate state include relay.

In one subembodiment, names of the second candidate state include indirect.

In one subembodiment, names of the second candidate state include L2.

In one subembodiment, names of the second candidate state include camp.

In one subembodiment, names of the second candidate state include connect.

In one subembodiment, names of the second candidate state include access.

In one subembodiment, the second candidate state and the first candidate state are different.

In one subembodiment, the second candidate state and the first candidate state are a same candidate state.

In one subembodiment, the second candidate state and the first candidate state are a same candidate state, and neither the second candidate state nor the first candidate state is being camped normally.

In one subembodiment, the second transition condition set comprises or only comprises that NAS indicates a need for establishing an RRC connection.

In one subembodiment, the second transition condition set comprises or only comprises transiting from an idle or inactive mode.

In one subembodiment, the second transition condition set comprises or only comprises that paging is received.

In one subembodiment, the second transition condition set comprises or only comprises that a first specific timer is expired.

In one subembodiment, the second transition condition set comprises or only comprises that a first specific timer is expired, where the first specific timer is one of T319, T319a, T319b, T329, or T429.

In one subembodiment, the phrase that the second candidate state can directly move to the connected mode means that the second candidate state needn't go through any other intermediate state before switching to the connected mode.

In one subembodiment, the phrase that the second candidate state can directly move to the connected mode means that the second candidate state doesn't go through any other intermediate state before switching to the connected mode.

In one subembodiment, the first condition set comprises or only comprises that: the first state is the second candidate state.

In one subembodiment, the phrase that as a response to any condition in a second transition condition set being satisfied, the second candidate state can directly move to the connected mode means that when the first node is in the second candidate state, if any condition in the second transition condition set is satisfied, the first node directly moves from the second candidate state to the connected mode and the action of moving to the connected mode does not go through any other intermediate state.

In one subembodiment, the phrase that as a response to any condition in a second transition condition set being satisfied, the second candidate state can directly move to the connected mode means that if any condition in the second transition condition set is satisfied, the second candidate state moves directly to the connected mode.

In one embodiment, the first state set comprises a second candidate state; as a response to any condition in a second transition condition set being satisfied, the second candidate state can directly move to the connected mode;

the phrase that the first state is used to determine whether to log measurement results based on the first area configuration includes: when the first state is the second candidate state, perform measurement result logging and the action of performing measurement result logging is unrelated to the first area configuration.

In one subembodiment, the second candidate state is being camped via relay.

In one subembodiment, the second candidate state is being relay-connected.

In one subembodiment, the second candidate state is being relay-camped.

In one subembodiment, the second candidate state is being indirectly camped.

In one subembodiment, the second candidate state is being indirectly camped normally.

In one subembodiment, names of the second candidate state include relay.

In one subembodiment, names of the second candidate state include indirect.

In one subembodiment, names of the second candidate state include L2.

In one subembodiment, names of the second candidate state include camp.

In one subembodiment, names of the second candidate state include connect.

In one subembodiment, names of the second candidate state include access.

In one subembodiment, the second candidate state and the first candidate state are different.

In one subembodiment, the second candidate state and the first candidate state are a same candidate state.

In one subembodiment, the second candidate state and the first candidate state are a same candidate state, and neither the second candidate state nor the first candidate state is being camped normally.

In one subembodiment, the second transition condition set comprises or only comprises that NAS indicates a need for establishing an RRC connection.

In one subembodiment, the second transition condition set comprises or only comprises transiting from an idle or inactive mode.

In one subembodiment, the second transition condition set comprises or only comprises that paging is received.

In one subembodiment, the second transition condition set comprises or only comprises that a first specific timer is expired.

In one subembodiment, the second transition condition set comprises or only comprises that a first specific timer is expired, where the first specific timer is one of T319, T319a, T319b, T329, or T429.

In one subembodiment, the phrase that the second candidate state can directly move to the connected mode means that the second candidate state needn't go through any other intermediate state before switching to the connected mode.

In one subembodiment, the phrase that the second candidate state can directly move to the connected mode means that the second candidate state doesn't go through any other intermediate state before switching to the connected mode.

In one subembodiment, the first condition set comprises or only comprises that: the first state is the second candidate state.

In one subembodiment, the phrase that as a response to any condition in a second transition condition set being satisfied, the second candidate state can directly move to the connected mode means that when the first node is in the second candidate state, if any condition in the second transition condition set is satisfied, the first node directly moves from the second candidate state to the connected mode and the action of moving to the connected mode does not go through any other intermediate state.

In one subembodiment, the phrase that as a response to any condition in a second transition condition set being satisfied, the second candidate state can directly move to the connected mode means that if any condition in the second transition condition set is satisfied, the second candidate state moves directly to the connected mode.

In one embodiment, the first state set comprises a second candidate state; as a response to any condition in a second transition condition set being satisfied, the second candidate state can directly move to the connected mode;
  the phrase that the first state is used to determine whether to log measurement results based on the first area configuration includes: the first state being the second candidate state, the first node performs measurement result logging and the action of performing measurement result logging is unrelated to the first area configuration.

In one subembodiment, the second candidate state is being camped via relay.

In one subembodiment, the second candidate state is being relay-connected.

In one subembodiment, the second candidate state is being relay-camped.

In one subembodiment, the second candidate state is being indirectly camped.

In one subembodiment, the second candidate state is being indirectly camped normally.

In one subembodiment, names of the second candidate state include relay.

In one subembodiment, names of the second candidate state include indirect.

In one subembodiment, names of the second candidate state include L2.

In one subembodiment, names of the second candidate state include camp.

In one subembodiment, names of the second candidate state include connect.

In one subembodiment, names of the second candidate state include access.

In one subembodiment, the second candidate state and the first candidate state are different.

In one subembodiment, the second candidate state and the first candidate state are a same candidate state.

In one subembodiment, the second candidate state and the first candidate state are a same candidate state, and neither the second candidate state nor the first candidate state is being camped normally.

In one subembodiment, the second transition condition set comprises or only comprises that NAS indicates a need for establishing an RRC connection.

In one subembodiment, the second transition condition set comprises or only comprises transiting from an idle or inactive mode.

In one subembodiment, the second transition condition set comprises or only comprises that paging is received.

In one subembodiment, the second transition condition set comprises or only comprises that a first specific timer is expired.

In one subembodiment, the second transition condition set comprises or only comprises that a first specific timer is expired, where the first specific timer is one of T319, T319a, T319b, T329, or T429.

In one subembodiment, the phrase that the second candidate state can directly move to the connected mode means that the second candidate state needn't go through any other intermediate state before switching to the connected mode.

In one subembodiment, the phrase that the second candidate state can directly move to the connected mode means that the second candidate state doesn't go through any other intermediate state before switching to the connected mode.

In one subembodiment, the first condition set comprises or only comprises that: the first state is the second candidate state.

In one subembodiment, the phrase that as a response to any condition in a second transition condition set being satisfied, the second candidate state can directly move to the connected mode means that when the first node is in the second candidate state, if any condition in the second transition condition set is satisfied, the first node directly moves from the second candidate state to the connected mode and the action of moving to the connected mode does not go through any other intermediate state.

In one subembodiment, the phrase that as a response to any condition in a second transition condition set being satisfied, the second candidate state can directly move to the connected mode means that if any condition in the second transition condition set is satisfied, the second candidate state moves directly to the connected mode.

In one embodiment, the first state set comprises a second candidate state; as a response to any condition in a second transition condition set being satisfied, the second candidate state can directly move to the connected mode;
  the phrase that the first state is used to determine whether to log measurement results based on the first area configuration includes: when the first state is the second candidate state, quality of a first cell is used to determine whether to perform measurement result logging based on the first area configuration;

herein, the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result logging is unrelated to the first area configuration.

In one subembodiment, the second candidate state is being camped via relay.

In one subembodiment, the second candidate state is being relay-connected.

In one subembodiment, the second candidate state is being relay-camped.

In one subembodiment, the second candidate state is being indirectly camped.

In one subembodiment, the second candidate state is being indirectly camped normally.

In one subembodiment, names of the second candidate state include relay.

In one subembodiment, names of the second candidate state include indirect.

In one subembodiment, names of the second candidate state include L2.

In one subembodiment, names of the second candidate state include camp.

In one subembodiment, names of the second candidate state include connect.

In one subembodiment, names of the second candidate state include access.

In one subembodiment, the second candidate state and the first candidate state are different.

In one subembodiment, the second candidate state and the first candidate state are a same candidate state.

In one subembodiment, the second candidate state and the first candidate state are a same candidate state, and neither the second candidate state nor the first candidate state is being camped normally.

In one subembodiment, the second transition condition set comprises or only comprises that NAS indicates a need for establishing an RRC connection.

In one subembodiment, the second transition condition set comprises or only comprises transiting from an idle or inactive mode.

In one subembodiment, the second transition condition set comprises or only comprises that paging is received.

In one subembodiment, the second transition condition set comprises or only comprises that a first specific timer is expired.

In one subembodiment, the second transition condition set comprises or only comprises that a first specific timer is expired, where the first specific timer is one of T319, T319a, T319b, T329, or T429.

In one subembodiment, the phrase that the second candidate state can directly move to the connected mode means that the second candidate state needn't go through any other intermediate state before switching to the connected mode.

In one subembodiment, the phrase that the second candidate state can directly move to the connected mode means that the second candidate state doesn't go through any other intermediate state before switching to the connected mode.

In one subembodiment, the first condition set comprises or only comprises that: the first state is the second candidate state.

In one subembodiment, the phrase that as a response to any condition in a second transition condition set being satisfied, the second candidate state can directly move to the connected mode means that when the first node is in the second candidate state, if any condition in the second transition condition set is satisfied, the first node directly moves from the second candidate state to the connected mode and the action of moving to the connected mode does not go through any other intermediate state.

In one subembodiment, the phrase that as a response to any condition in a second transition condition set being satisfied, the second candidate state can directly move to the connected mode means that if any condition in the second transition condition set is satisfied, the second candidate state moves directly to the connected mode.

In one subembodiment, the first quality standard is criterion S.

In one subembodiment, a cell that meets the first quality criterion is a suitable cell; a suitable cell is a cell that satisfies the first quality standard.

In one subembodiment, the first cell is a cell to which the first relay connects.

In one subembodiment, the first cell is a serving cell of the first relay.

In one subembodiment, the first cell is a PCell of the first relay.

In one subembodiment, the first cell is a cell on which the first relay is camped.

In one subembodiment, the first cell is a neighboring cell of a serving cell of the first relay.

In one subembodiment, the first cell is a neighboring cell of a PCell of the first relay.

In one subembodiment, the first cell is a neighboring cell or adjacent frequency cell of a cell on which the first relay is camped.

In one subembodiment, the first cell is a neighboring cell of a serving cell of the first relay.

In one subembodiment, the first cell is a cell from which a SIB is received by the first node.

In one subembodiment, the first cell is a cell from which a paging message is received by the first node.

In one subembodiment, the first cell belongs to a cell indicated by the first area configuration.

In one subembodiment, the first cell belongs to frequency indicated by the first area configuration.

In one subembodiment, the first cell belongs to a cell indicated by the first area configuration.

In one subembodiment, the first cell belongs to a cell indicated by the first measurement configuration.

In one subembodiment, the first node is out of coverage of the first cell.

In one subembodiment, the first node is within coverage of the first cell.

In one embodiment, a first cell is a serving cell of the first relay, for the first node, the quality of the first cell does not meet the first quality criterion, and the first cell is a suitable cell for the first node.

In one embodiment, the phrase of determining according to the first state whether to perform measurement result logging based on the first area configuration includes that: when the first state is the first candidate state and none of conditions in the first condition set is satisfied, measurement result logging is performed based on the first area configuration.

In one embodiment, the first state set only comprises the first candidate state.

In one embodiment, the first candidate state is a state other than being camped normally; the first condition set comprises or only comprises that: the first candidate state is a state other than being camped normally.

In one embodiment, the first candidate state is a state other than being camped normally; the first condition set comprises or only comprises that: the first candidate state is a relay-based state.

In one embodiment, the first candidate state is a state other than being camped normally; the first condition set comprises or only comprises that: the first candidate state is being camped normally; the phrase of determining according to the first state whether to perform measurement result logging based on the first area configuration includes: when the first state is the first candidate state and none of conditions in the first condition set is satisfied, measurement result logging is performed based on the first area configuration.

In one subembodiment, information about the first relay is included in the measurement result logs.

In one embodiment, the phrase that the first state is used to determine whether to log measurement results based on the first area configuration includes that the quality of a first cell is used to determine whether to perform measurement result logging based on the first area configuration.

herein, the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result logging is unrelated to the first area configuration.

In one subembodiment, the first condition set comprises or only comprises that: the first candidate state is a state other than being camped normally.

In one subembodiment, the first condition set comprises or only comprises that: the first candidate state is a relay-based state.

In one subembodiment, the first cell is a serving cell of the first node.

In one subembodiment, the first cell is a cell on which the first node is camped.

In one subembodiment, the first cell is a cell measured by the first node.

In one subembodiment, the first cell is a serving cell of the first relay.

In one subembodiment, the first cell is a PCell of the first relay.

In one subembodiment, the first cell is a cell on which the first relay is camped.

In one subembodiment, the first node is out of coverage, so that the quality of the first cell does not meet a first quality criterion.

In one embodiment, the quality of the first cell does not satisfy a first quality criterion, so that the first node is out of coverage.

In one subembodiment, the action of performing measurement result logging includes logging a result of measurement on the first cell.

In one embodiment, the T330 is running.

In one embodiment, VarLogMeasConfig is not released.

In one embodiment, the meaning of the phrase of performing measurement result logging based on the first area configuration is or includes that if a cell belongs to an area indicated by the first area configuration, measurement result logging is performed; or if a cell does not belong to an area indicated by the first area configuration, measurement result logging is not performed.

In one embodiment, the meaning of the phrase of performing measurement result logging based on the first area configuration is or includes that if a cell belongs to an area indicated by the first area configuration, measurement result logging is performed; or if a cell does not belong to an area indicated by the first area configuration, the measurement result logging performed does not include the cell.

In one embodiment, the meaning of the phrase of performing measurement result logging based on the first area configuration is or includes that if a cell belongs to an area indicated by the first area configuration, measurement result logging performed includes a measurement result of the cell; or if a cell does not belong to an area indicated by the first area configuration, the measurement result logging performed doesn't include a measurement result of the cell.

In one embodiment, the meaning of the phrase of performing measurement result logging based on the first area configuration is or includes that if a cell belongs to an area indicated by the first area configuration, measurement result logging performed includes the cell; or if a cell does not belong to an area indicated by the first area configuration, the measurement result logging performed does not include the cell.

In one embodiment, according to the first area configuration, a cell either belongs to an area indicated by the first area configuration or not belongs to an area indicated by the first area configuration.

In one embodiment, the meaning of the phrase of performing measurement result logging based on the first area configuration is or includes that if a cell selected belongs to an area indicated by the first area configuration, measurement result logging performed includes a measurement result of the cell selected; or if a cell selected does not belong to an area indicated by the first area configuration, the measurement result logging performed doesn't include a measurement result of the cell selected.

In one embodiment, the meaning of the phrase of performing measurement result logging based on the first area configuration is or includes that the first node is not within a first cell, the first cell being a serving cell of the first relay, and the first operation set performed by the first node in the first state is for the first cell; if the first cell belongs to an area indicated by the first area configuration, measurement result logging performed includes a measurement result of the first cell; or if the first cell does not belong to an area indicated by the first area configuration, the measurement result logging performed doesn't include a measurement result of the first cell.

In one subembodiment, the phrase that the first operation set performed by the first node in the first state is for the first cell means that the paging message monitored by the first node via the first relay is from the first cell.

In one subembodiment, the phrase that the first node is not within a first cell means that the first node is out of coverage of the first cell.

In one subembodiment, the phrase that the first node is not within a first cell means that quality of the first cell does not meet the first quality criterion.

In one embodiment, the meaning of the phrase of performing measurement result logging based on the first area configuration is or includes that the first node is within a second cell but not within a first cell, the first cell being a serving cell of the first relay, and the first operation set performed by the first node in the first state is for the first cell; whether measurement result logging performed includes a measurement result of the second cell is determined according to whether the first cell belongs to an area indicated by the first area configuration.

In one subembodiment, the phrase that the first operation set performed by the first node in the first state is for the first cell means that the paging message monitored by the first node via the first relay is from the first cell.

In one subembodiment, the phrase that the first node is not within a first cell means that the first node is out of coverage of the first cell.

In one subembodiment, the phrase that the first node is not within a first cell means that quality of the first cell does not meet the first quality criterion.

In one subembodiment, the statement that whether measurement result logging performed includes a measurement result of the second cell is determined according to whether the first cell belongs to an area indicated by the first area configuration means that if the first cell belongs to an area indicated by the first area configuration, measurement result logging performed includes a measurement result of the second cell; or if the first cell does not belong to an area indicated by the first area configuration, the measurement result logging performed doesn't include a measurement result of the second cell.

In one subembodiment, the statement that whether measurement result logging performed includes a measurement result of the second cell is determined according to whether the first cell belongs to an area indicated by the first area configuration means that if the first cell and the second cell both belong to an area indicated by the first area configuration, measurement result logging performed includes a measurement result of the second cell; or if the first cell does not belong to an area indicated by the first area configuration, the measurement result logging performed doesn't include a measurement result of the second cell.

In one subembodiment, the statement that whether measurement result logging performed includes a measurement result of the second cell is determined according to whether the first cell belongs to an area indicated by the first area configuration means that if the second cell belongs to an area indicated by the first area configuration, measurement result logging performed includes a measurement result of the second cell; or if neither the first cell not the second cell belongs to an area indicated by the first area configuration, the measurement result logging performed doesn't include a measurement result of the second cell.

In one subembodiment, the statement that whether measurement result logging performed includes a measurement result of the second cell is determined according to whether the first cell belongs to an area indicated by the first area configuration means that if the first cell and the second cell both belong to an area indicated by the first area configuration, measurement result logging performed includes a measurement result of the second cell; or if neither the first cell not the second cell belongs to an area indicated by the first area configuration, the measurement result logging performed doesn't include a measurement result of the second cell.

In one subembodiment, the statement that whether measurement result logging performed includes a measurement result of the second cell is determined according to whether the first cell belongs to an area indicated by the first area configuration means that if the first cell belongs to an area indicated by the first area configuration but the second cell doesn't belong to the area indicated by the first area configuration, measurement result logging performed includes a measurement result of the second cell.

In one subembodiment, the statement that whether measurement result logging performed includes a measurement result of the second cell is determined according to whether the first cell belongs to an area indicated by the first area configuration means that: in one subembodiment, if the first cell doesn't belong to a cell indicated by the first area configuration but the second cell belongs to the cell indicated by the first area configuration, measurement result logging performed does not include a measurement result of the second cell.

In one embodiment, the first state is a state other than being camped on any cell.

In one embodiment, the first relay is a suitable relay.

In one embodiment, the phrase of determining according to the first state whether to perform measurement result logging based on the first area configuration includes that: when the first state is being camped normally and none of conditions in the first condition set is being satisfied, measurement result logging is performed based on the first area information.

In one embodiment, as a response to receiving the first measurement configuration, the first node stores at least the first area configuration comprised in the first measurement configuration in a first variable.

In one subembodiment, the first variable is VarLogMeasConfig.

In one embodiment, the first relay is being camped normally or in a connected mode.

Embodiment 2

Figure 2:
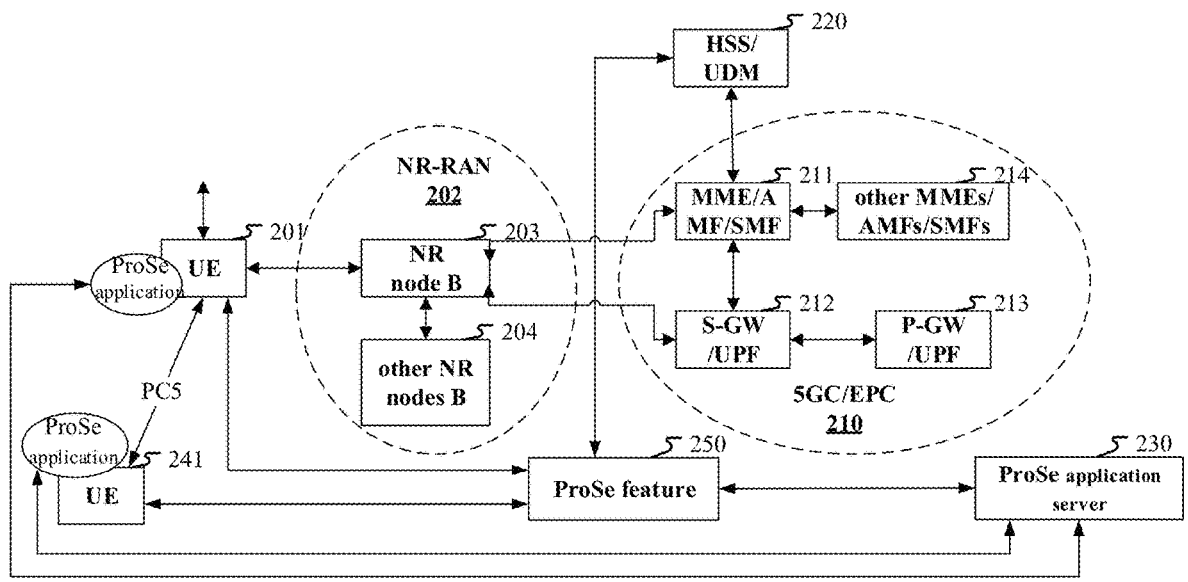
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241, an NG-RAN 202, a 5G-Core Network/Evolved Packet Core (5GC/EPC) 210, a Home Subscriber Server/Unified Data Management (HSS/UDM) 220, a ProSe feature 250 and ProSe application server 230. The V2X communication architecture may be interconnected with other access networks. For simple description, the entities/interfaces are not shown. As shown in FIG. 2, the V2X communication architecture provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is connected with the ProSe application of the UE 201 and the ProSe application of the UE 241 respectively via a PC1 Reference Point.

In one embodiment, the first node in the present application is the UE 201.

In one embodiment, the second node in the present application is the gNB 203.

In one embodiment, the third node in the present application is the UE 241.

In one embodiment, a radio link between the UE 201 and the UE 241 corresponds to a sidelink (SL) in the present application.

In one embodiment, a radio link from the UE 201 to the NR Node B is an uplink.

In one embodiment, a radio link from the NR Node B to the UE 201 is a downlink.

In one embodiment, a radio link from the UE 241 to the NR Node B is an uplink.

In one embodiment, a radio link from the NR Node B to the UE 241 is a downlink.

In one embodiment, the UE 201 supports relay transmission.

In one embodiment, the UE 241 supports relay transmission.

In one embodiment, the UE 201 includes cellphone.

In one embodiment, the UE 241 includes cellphone.

In one embodiment, the UE 201 is a means of transportation including automobile.

In one embodiment, the UE 241 is a means of transportation including automobile.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
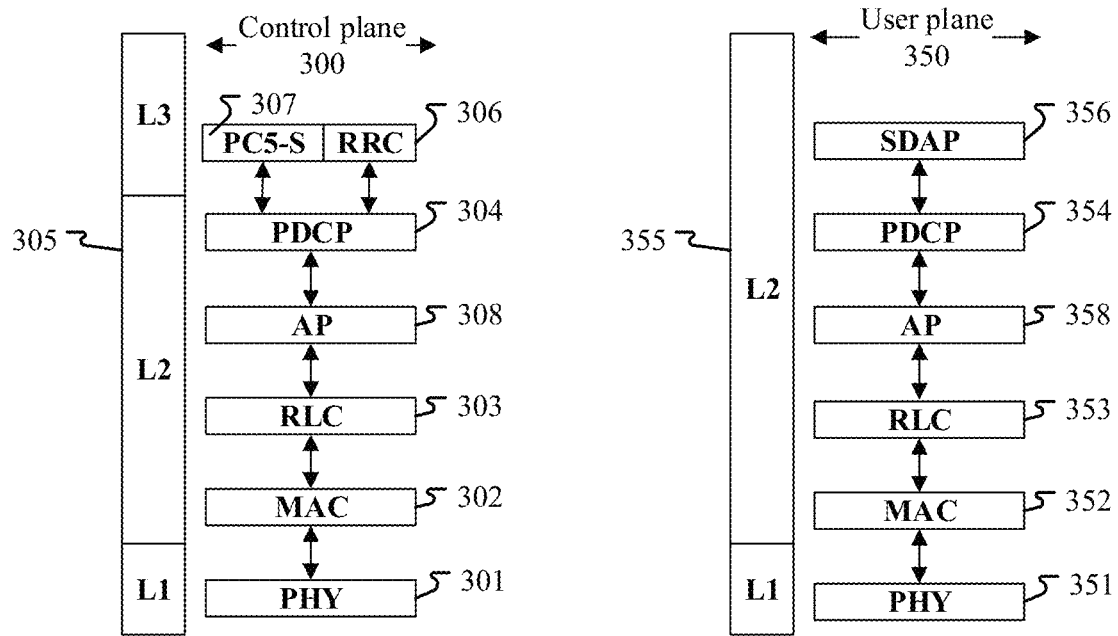
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involved with relay services, its control plane can also comprise an adaption sublayer AP 308, and its user plane can also comprise an adaption sublayer AP 358. The introduction of the adaption layer is beneficial for lower layers such as the MAC or the RLC layer to multiple and/or distinguish data from multiple source UEs. For UE-UE communications relating to relay services, the adaption sublayer can be excluded. Besides, adaption sublayers AP 308 and AP 358 can respectively serve as sublayers of the PDCP 304 and PDCP 354. The RRC 306 can be used for processing an RRC signaling of the Uu interface and a signaling of the PC5 interface.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first measurement configuration in the present application is generated by the RRC 306.

In one embodiment, the first measurement report in the present application is generated by the RRC 306.

Embodiment 4

Figure 4:
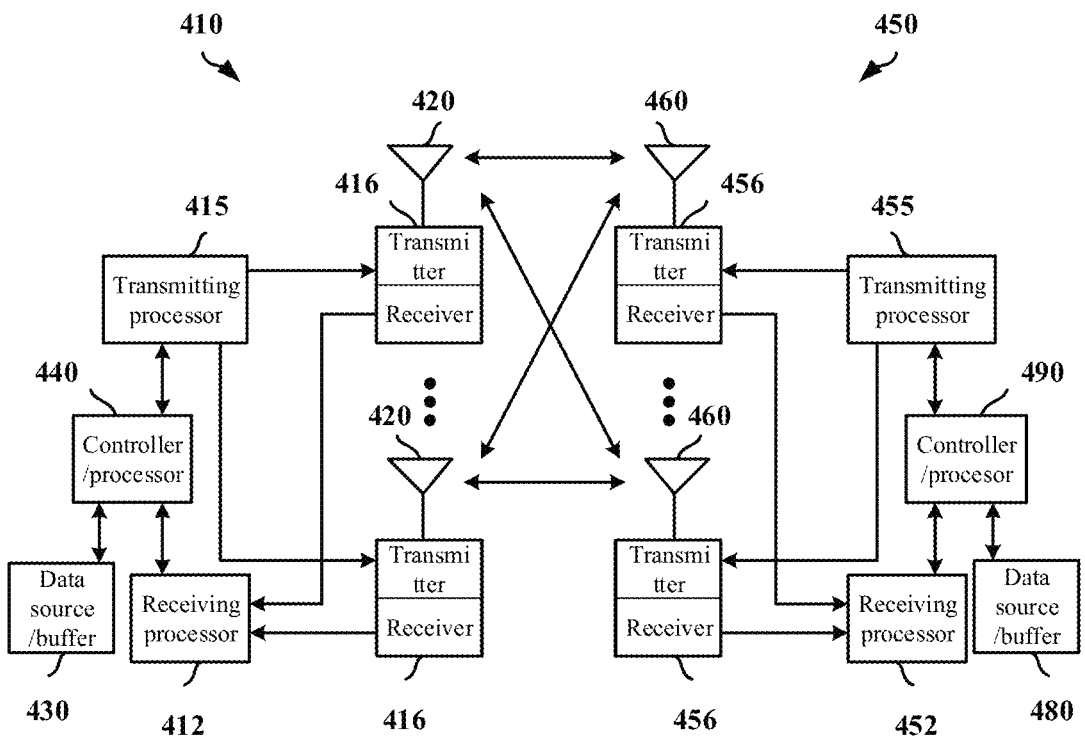
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first measurement configuration, the first measurement configuration comprising a first area configuration; and performs a first operation set in a first state; and determines according to the first state whether to perform measurement result logging based on the first area configuration; herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the first communication node 450 comprises a memory that stores a computer readable instruction program, the computer readable instruction program generates actions when executed by at least one processor, which include: receiving a first measurement configuration, the first measurement configuration comprising a first area configuration; and performing a first operation set in a first state; and determining according to the first state whether to perform measurement result logging based on the first area configuration; herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first measurement configuration, the first measurement configuration comprising a first area configuration; a receiver of the first measurement configuration, which is in a first state, performs a first operation set; and determines according to the first state whether to perform measurement result logging based on the first area configuration; herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the second communication device 410 comprises a memory that stores a computer readable instruction program, the computer readable instruction program generates actions when executed by at least one processor, which include: transmitting a first measurement configuration, the first measurement configuration comprising a first area configuration; a receiver of the first measurement configuration, which is in a first state, performing a first operation set; and determining according to the first state whether to perform measurement result logging based on the first area configuration; herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the first communication device 450 corresponds to the first node in the present application.

In one embodiment, the second communication device 410 corresponds to the second node in the present application.

In one embodiment, the first communication device 450 corresponds to the third node in the present application.

In one embodiment, the first communication device 450 is a UE.

In one embodiment, the first communication device 450 is a vehicle-mounted terminal.

In one embodiment, the first communication device 450 is a cellphone.

In one embodiment, the first communication device 450 is a relay.

In one embodiment, the second communication device 410 is a base station.

In one embodiment, the receiver 456 (comprising the antenna 460), the receiving processor 452 and the controller/processor 490 are used for receiving the first measurement configuration in the present application.

In one embodiment, the transmitter 456 (comprising the antenna 460), the transmitting processor 455 and the controller/processor 490 are used for transmitting the first measurement report in the present application.

In one embodiment, the transmitter 416 (comprising the antenna 420), the transmitting processor 412 and the controller/processor 440 are used for transmitting the first measurement configuration in the present application.

In one embodiment, the receiver 416 (comprising the antenna 420), the receiving processor 412 and the controller/processor 440 are used for receiving the first measurement report in the present application.

Embodiment 5

Figure 5:
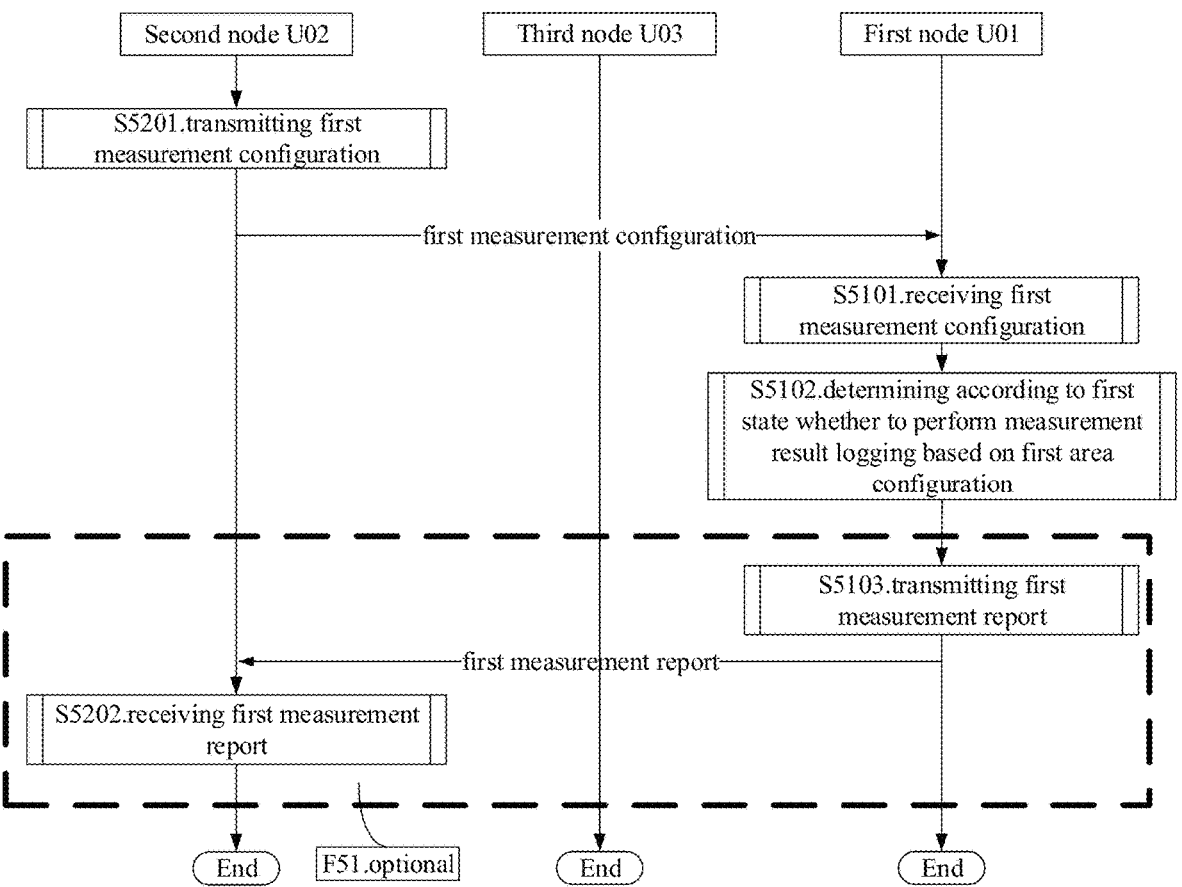
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to a first node in the present application, U02 corresponds to a second node in the present application, and a third node U03 corresponds to the first relay in the present application. It should be particularly noted that the order presented in this embodiment does not limit the order of signal transmissions or the order of implementations of the present application; herein, steps marked by the F51 are optional.

The first node U01 receives a first measurement configuration in step S5101; and determines according to a first state whether to perform measurement result logging based on a first area configuration in step S5102; and transmits a first measurement report in step S5103.

The second node U02 transmits a first measurement configuration in step S5201; and receives a first measurement report in step S5202.

In Embodiment 5, the first measurement configuration comprises a first area configuration; the first node, which is in a first state, performs a first operation set; the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; in the step S5102, determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the first measurement configuration is directly transmitted to the first node U01 without being relayed.

In one embodiment, the first measurement configuration is transmitted to the first node U01 via relay.

In one embodiment, the first measurement configuration is transmitted to the first node U01 via the first relay.

In one embodiment, the first measurement report is directly transmitted to the second node U02 without being relayed.

In one embodiment, the first measurement report is transmitted to the second node U02 via relay.

In one embodiment, the first measurement report is transmitted to the second node U02 via the first relay.

In one embodiment, the first node U01 is a U2N relay UE.

In one embodiment, the first node U01 is a U2N remote UE.

In one embodiment, the first node U01 is an NR ProSe U2N remote UE.

In one embodiment, the third node U03 is a UE.

In one embodiment, the third node U03 is a L2 U2N relay UE.

In one embodiment, the third node U03 is a U2N relay of the first node U01.

In one embodiment, the third node U03 is a L2 relay of the first node U01.

In one embodiment, the third node U03 is an NR ProSe U2N relay.

In one embodiment, the third node U03 is a U2N relay UE.

In one embodiment, the third node U03 provides L2 U2N relay service to the first node U01.

In one embodiment, when transmitting the first measurement configuration, the second node U02 is a serving cell of the first node U01.

In one embodiment, when transmitting the first measurement configuration, the second node U02 is a Primary Cell (PCell) of the first node U01.

In one embodiment, when transmitting the first measurement configuration, the second node U02 is a Master Cell Group (MCG) of the first node U01.

In one embodiment, when transmitting the first measurement configuration, the second node U02 is a base station to which a Primary Cell (PCell) of the first node U01 corresponds or belongs.

In one embodiment, when transmitting the first measurement configuration, the second node U02 is a base station to which a Primary Cell (PCell) of the third node U03 corresponds or belongs.

In one embodiment, when transmitting the first measurement configuration, the second node U02 is a serving cell of the third node U03.

In one embodiment, when transmitting the first measurement configuration, the second node U02 is unrelated to the third node U03.

In one embodiment, when transmitting the first measurement configuration, the second node U02 is neither a serving cell nor a PCell of the third node U03.

In one embodiment, when transmitting the first measurement configuration, the second node U02 is a Primary Cell (PCell) of the third node U03.

In one embodiment, when transmitting the first measurement configuration, the second node U02 is a Master Cell Group (MCG) of the third node U03.

In one embodiment, when transmitting the first measurement configuration, the second node U02 is a base station to which a Primary Cell (PCell) of the third node U03 corresponds or belongs.

In one embodiment, when receiving the first measurement configuration, the first node U01 and the third node U03 have a same PCell.

In one embodiment, there is an RRC connection between the first node U01 and the third node U03.

In one embodiment, there is a PC5 connection between the first node U01 and the third node U03.

In one embodiment, there is an RRC connection between the third node U03 and the second node U02.

In one embodiment, when receiving the first measurement configuration, there is an RRC connection between the first node U01 and the second node U02.

In one embodiment, the third node U03 applies system information of the second node U02.

In one embodiment, the first node U01 applies system information forwarded by the third node U03.

In one embodiment, the first node U01 applies system information from the second node U02 forwarded by the third node U03.

In one embodiment, the first node U01 is in communication with the second node U02 via an indirect path when receiving the first measurement configuration.

In one embodiment, the first node U01 is in communication with the second node U02 via a direct path when receiving the first measurement configuration.

In one embodiment, the first node U01 is in communication with the third node U03 via a sidelink.

In one embodiment, a direct link is established between the first node U01 and the third node U03.

In one embodiment, the first measurement configuration is transmitted to the first node U01 by forwarding of the third node U03.

In one subembodiment, the forwarding is L2 forwarding.

In one subembodiment, the third node U03 does not change the PDCP PDU occupied for bearing the first measurement configuration when forwarding the first measurement configuration.

In one embodiment, a communication interface between the second node U02 and the third node U03 is a Uu interface.

In one embodiment, a communication interface between the first node U01 and the third node U03 is a PC5 interface.

In one embodiment, when step S5102 is executed, the second node U02 is not a serving cell of the first node U01.

In one embodiment, when step S5102 is executed, the first node U01 transits from the RRC connected state.

In one embodiment, when step S5102 is executed, the first node U01 transits from the connected mode.

In one embodiment, before execution of step S5102 and after the step S5101 is executed, the first node U01 enters the first state.

In one subembodiment, the first node U01 selects the third node U03.

In one subembodiment, the first node U01 selects the third node U03 as a suitable relay.

In one subembodiment, the first node U01 selects the third node U03 as a suitable L2 U2N relay UE.

In one embodiment, before step S5102 is executed, the first node U01 transits from the RRC connected state.

In one embodiment, before step S5102 is executed, the first node U01 transits from the connected mode.

In one embodiment, the first operation set is for the second node U02.

In one subembodiment, the phrase that "in one embodiment, the first operation set is for the second node U02" means that the first node U01 listens over paging from the second node U02 via the first relay.

In one subembodiment, the phrase that "in one embodiment, the first operation set is for the second node U02" means that the first node U01 listens over system information from the second node U02 via the first relay.

In one embodiment, when step S5102 is executed, the second node U02 is a suitable cell for the first node U01.

In one embodiment, when step S5102 is executed, the second node U02 is not a suitable cell for the first node U01.

In one embodiment, the first measurement report is generated based on the measurement result logs.

In one embodiment, the first measurement report is triggered by UEInformationRequest received by the first node U01.

In one embodiment, the first measurement report is generated based on a VarLogMeasReport.

In one embodiment, the action of performing measurement result logging includes: recording the measurement result in a VarLogMeasReport.

In one embodiment, the first measurement report comprises: a logMeasReport.

In one embodiment, the first measurement report comprises a traceReference indicated by the first measurement configuration.

In one embodiment, the first measurement report comprises an absoluteTimeStamp.

In one embodiment, the first measurement report comprises a traceRecordingSessionRef.

In one embodiment, the first measurement report comprises a tce-Id.

In one embodiment, the first measurement report comprises a logMeasInfoList.

In one subembodiment, the logMeasInfoList comprises at least one LogMeasInfo, the at least one LogMeasInfo including at least one of {locationInfo, relativeTimeStamp, servCellIdentity, a measurement result of serving cell, a measurement result of neighboring cell, any cell selection being detected}.

In one embodiment, the first node U01 enters the connected mode when transmitting the first measurement report.

In one embodiment, the first node U01 enters the RRC connected state when transmitting the first measurement report.

In one embodiment, the first measurement report is transmitted via an SRB1.

In one embodiment, a time gap between transmitting the first measurement report and receiving the first measurement configuration does not exceed 48 hours.

In one embodiment, as a response to receiving the first measurement configuration, the first node U01 sets a PLMN identity list in the VarLogMeasReport.

In one embodiment, as a response to receiving the first measurement configuration, the first node U01 sets at least one of an absoluteTimeInfo, a traceReference, a traceRecordingSessionRef or a tce-Id received in the VarLogMeasReport.

In one embodiment, the first node U01 starts a first timer as a response to receiving the first measurement configuration, where a value of the first timer is a first time length, the first measurement configuration comprising the first time length; and performs measurement result logging as a response to the first timer staying in a state of running.

In one subembodiment, the first timer is T330.

In one subembodiment, the first timer is T430.

In one subembodiment, the first timer is T330a.

In one subembodiment, the first timer is T331.

In one subembodiment, running time of the first timer is x minute(s), where x is a positive integer.

In one subembodiment, the first measurement configuration comprises a loggingDuration, where the first time length is loggingDuration.

In one subembodiment, expiration of the first timer triggers the first node U01's release of the first variable.

In one subembodiment, expiration of the first timer triggers the first node U01's release of the first variable; the first variable is VarLogMeasConfig.

In one subembodiment, once the first timer is running, the first node U01 performs measurement result logging or performs the measurement result logging based on the first area configuration.

In one embodiment, as indicated by the first measurement configuration, a report type is event-triggered, and an event type is outOfCoverage.

In one subembodiment, when in the third state, the first node U01 performs measurement result logging according to a loggingInterval indicated by the first measurement configuration.

In one subembodiment, when in the first state, the first node U01 performs measurement result logging according to a loggingInterval indicated by the first measurement configuration.

In one subembodiment, when in the any cell selection state, the first node U01 performs measurement result logging according to a loggingInterval indicated by the first measurement configuration.

In one subembodiment, when moving from any cell selection to the first state, the first node U01 performs measurement result logging according to a loggingInterval indicated by the first area configuration.

In one subembodiment, when moving from any cell selection to the first state, the first node U01 performs measurement result logging according to a loggingInterval indicated by the first area configuration, where a plmn-IdentityList in the VarLogMeasReport comprises an RPLMN.

In one subembodiment, when moving from any cell selection to the first state, the first node U01 performs measurement result logging according to a loggingInterval indicated by the first area configuration, where a plmn-IdentityList in the VarLogMeasReport comprises an RPLMN, the first state being a state other than being camped normally.

In one subembodiment, a serving cell of the first relay is not a suitable cell of the first node U01.

In one subembodiment, the first node is out of coverage of a serving cell of the first relay.

In one subembodiment, a serving cell of the first relay does not meet the first quality criterion for the first node U01.

In one embodiment, the first node U01 performs measurement result logging, and adds first information in the measurement result logs, the first information being used for indicating at least one of a first state, receiving network information via relay, being out of coverage of a first cell, or the first relay.

In one subembodiment, the state variable VarLogMeasReport includes at least one of a first state, receiving network information via relay, being out of coverage of a first cell or the first relay.

In one subembodiment, the phrase of adding first information in the measurement result logs includes: storing the first information in the state variable VarLogMeasReport.

In one subembodiment, the state variable VarLogMeasReport comprises a first state being detected.

In one subembodiment, the state variable VarLogMeasReport comprises relay-related information.

In one subembodiment, the state variable VarLogMeasReport comprises an identity of the first relay.

In one subembodiment, the first information explicitly comprises at least one of a first state, receiving network information via relay, being out of coverage of a first cell or the first relay.

In one subembodiment, the first cell is a serving cell of the first relay.

In one subembodiment, the first cell is a PCell of the first relay.

In one subembodiment, the first measurement report comprises the first information.

In one subembodiment, the first measurement report comprises second information, the second information being used to indicate at least one of a first state, receiving network information via relay, being out of coverage of a first cell or the first relay.

In one embodiment, as indicated by the first measurement configuration, a report type is event-triggered, and an event type is eventL1.

In one embodiment, as indicated by the first measurement configuration, a report type is event-triggered, and an event type is Type 1, which is a type other than outOfCoverage and eventL1.

In one subembodiment, the first node U01 adds information about the first relay in measurement result logs.

In one subembodiment, the first node U01 adds a measurement result about the first relay in measurement result logs.

In one embodiment, the first node U01 performs measurement result logging, and adds an identity of a first cell in the measurement result logs, the first cell belonging to an area indicated by the first area configuration;

herein, the first cell is a serving cell when the first relay is not in an RRC connected state or a Primary Cell (PCell) when the first relay is in an RRC connected state.

In one subembodiment, the phrase of adding an identity of a first cell in the measurement result logs includes a meaning of adding the identity of the first cell in a VarLogMeasReport.

In one subembodiment, the phrase of adding an identity of a first cell in the measurement result logs includes a meaning of adding the identity of the first cell in a LogMeasInfo.

In one subembodiment, the phrase of adding an identity of a first cell in the measurement result logs includes a meaning of adding the identity of the first cell in a measResultServingCell.

In one subembodiment, the phrase of adding an identity of a first cell in the measurement result logs includes a meaning of adding the identity of the first cell in a measResultNeighCells.

In one subembodiment, the phrase of adding an identity of a first cell in the measurement result logs includes a meaning of adding the identity of the first cell in a measResultRelay.

In one subembodiment, the first node U01 adds an identity of the first relay in the measurement result logs.

In one subembodiment, the first node U01 adds a Layer-2 ID of the first relay in the measurement result logs.

In one subembodiment, the first node U01 indicates in the measurement result logs that the first cell is connected via relay.

In one subembodiment, the first node U01 indicates in the first measurement report that the first cell is connected via relay.

In one embodiment, the first state is a state out of coverage and connecting to the network via relay.

In one embodiment, the first state supports services other than those of emergency.

In one embodiment, the quality of the first cell does not meet the first quality criterion.

In one embodiment, the quality of the first cell meets the first quality criterion.

In one embodiment, the first node adds a measurement result of the first cell in measurement result logs.

In one embodiment, the measurement result logs do not include the measurement result of the first cell.

In one embodiment, the measurement result logs comprise second information, the second information being used to indicate that the first cell is out of coverage.

In one embodiment, the measurement result logs comprise second information, the second information being used to indicate that the first cell does not meet the first quality criterion.

In one embodiment, the measurement result logs comprise second information, the second information comprising outOfCoverage.

In one embodiment, the first node U01 adds a first measurement result of a first cell in measurement result logs, the first state being used to determine whether the first measurement result is added into a measResultServingCell or measResultNeighCells.

In one subembodiment, the first cell is a serving cell of the first relay.

In one subembodiment, the first cell is a suitable cell of the first relay.

In one subembodiment, the first cell is a camped cell of the first relay.

In one embodiment, the first node U01 adds a first measurement result of a first cell in measurement result logs, and whether the first cell meets the first quality criterion is used to determine whether the first measurement result is added into a measResultServingCell or measResultNeighCells.

In one subembodiment, the first cell is a serving cell of the first relay.

In one subembodiment, the first cell is a suitable cell of the first relay.

In one subembodiment, the first cell is a camped cell of the first relay.

In one embodiment, the first node U01 adds a first measurement result of a first cell in measurement result logs, the measurement result of the first cell being added into an item other than measResultServingCell and measResultNeighCells.

In one subembodiment, the first cell is a serving cell of the first relay.

In one subembodiment, the first cell is a suitable cell of the first relay.

In one subembodiment, the first cell is a camped cell of the first relay.

Embodiment 6

Figure 6:
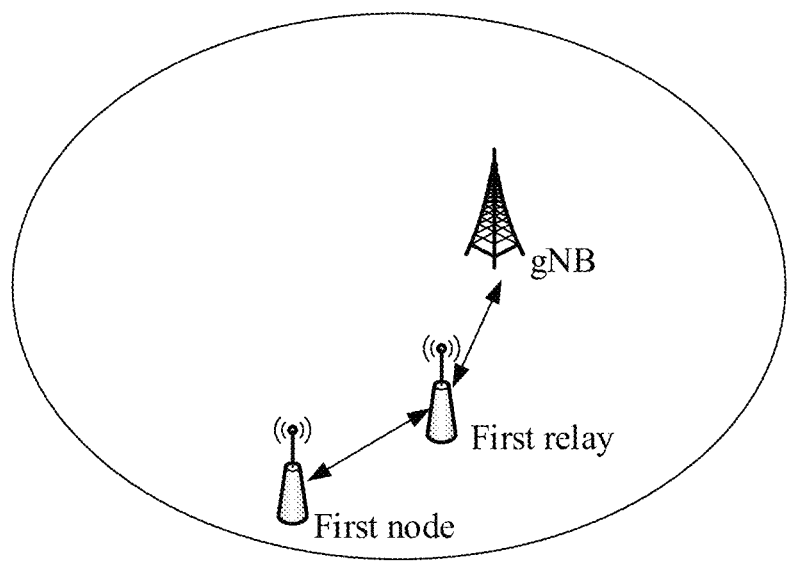
FIG. 6 illustrates a schematic diagram of an area according to one embodiment of the present application.
Figure 6:
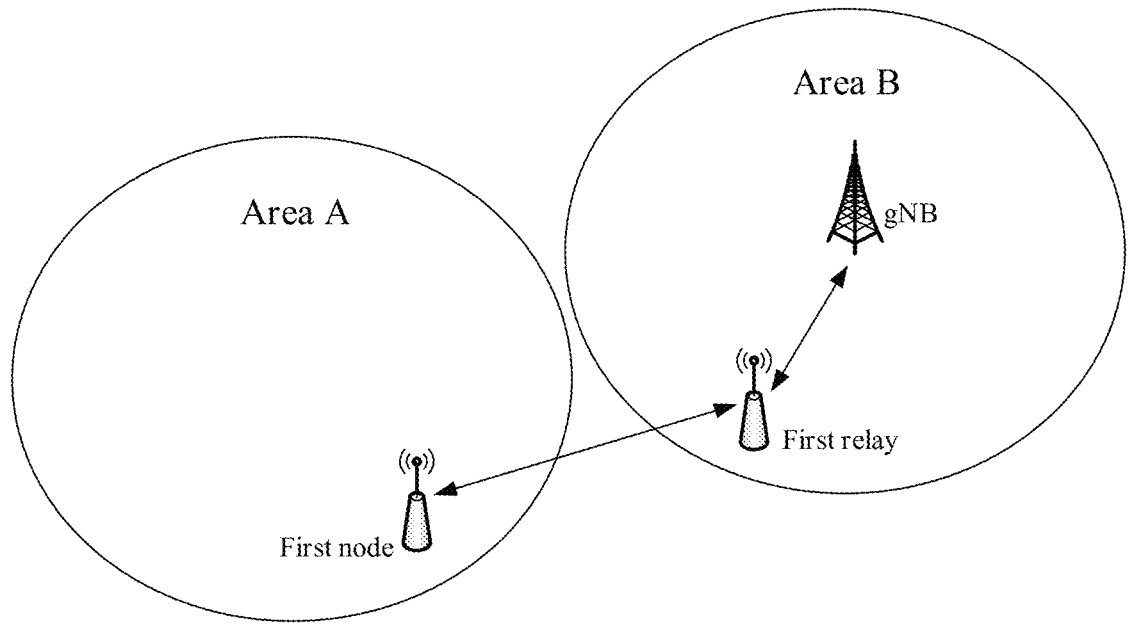

Embodiment 6 illustrates a schematic diagram of an area according to one embodiment of the present application, as shown in FIG. 6.

FIG. 6 comprises parts (a) and (b) that correspond to two scenarios, respectively.

As shown in FIG. 6(a), a first node receives information from a gNB via a first relay, and a first cell is a serving cell of the first relay, the first node being within coverage of the first cell.

In one embodiment, as given in FIG. 6(a), quality of the first cell meets the first quality criterion.

In one embodiment, as given in FIG. 6(a), the first cell is a PCell of the first relay.

In one embodiment, as given in FIG. 6(a), the first node is in the first state.

In one embodiment, as given in FIG. 6(a), the first relay is a suitable relay.

In one embodiment, as given in FIG. 6(a), the first cell is a suitable cell for the first relay.

In one embodiment, as given in FIG. 6(a), the first node performs measurement result logging according to whether the first cell is in an area indicated by the first area configuration.

In one embodiment, as given in FIG. 6(a), when the first state is a state that can directly switch to a connected mode, the first node performs measurement result logging according to whether the first cell is in an area indicated by the first area configuration.

In one embodiment, as given in FIG. 6(a), when the first state is a relay-based state, the first node performs measurement result logging according to whether the first cell is in an area indicated by the first area configuration.

In one embodiment, as given in FIG. 6(a), when the first state is a relay-based state, the first node performs measurement result logging according to whether the first cell is in an area indicated by the first area configuration, where the first state is not camped normally.

In one embodiment, as given in FIG. 6(a), the first condition set is or includes: the first state is a relay-based state.

In one embodiment, as given in FIG. 6(a), the first condition set is or includes: the first state is not camped normally but can directly switch to the connected mode.

In one embodiment, as given in FIG. 6(a), the first condition set is or includes: the first state is not camped normally or camped on any cell, but can directly switch to the connected mode.

As shown in FIG. 6(b), a first node receives information from a gNB via a first relay, and a first cell is a serving cell of the first relay, the first node not being within coverage of the first cell; the first cell is a cell within area B; the first node is within area A.

In one embodiment, the area B in FIG. 6(b) only comprises the first cell.

In one embodiment, the area B in FIG. 6(b) comprises the first cell and other cell(s).

In one embodiment, the area A in FIG. 6(b) is a cell.

In one embodiment, the area A in FIG. 6(b) does not cover any cell.

In one embodiment, as given in FIG. 6(b), the phrase of determining according to the first state whether to perform measurement result logging based on the first area configuration includes: the first node performs measurement result logging for a cell in the area A based on whether the first cell belongs to an area indicated by a first area configuration.

In one embodiment, as given in FIG. 6(b), the phrase of determining according to the first state whether to perform measurement result logging based on the first area configuration includes: the first node performing measurement result logging for a cell in the area A is unrelated to whether the first cell belongs to an area indicated by the first area configuration.

In one embodiment, as given in FIG. 6(b), the phrase of determining according to the first state whether to perform measurement result logging based on the first area configuration includes: the first node performing measurement result logging for a cell in the area A is both related to the first cell and whether the cell in the area A belongs to an area indicated by the first area configuration.

In one embodiment, as given in FIG. 6(b), the phrase of determining according to the first state whether to perform measurement result logging based on the first area configuration includes: the first node performing measurement result logging for a cell in the area A is unrelated to whether the first cell belongs to an area indicated by the first area configuration, but instead is only related to whether the cell in the area A belongs to an area indicated by the first area configuration.

In one embodiment, as given in FIG. 6(b), the phrase of determining according to the first state whether to perform measurement result logging based on the first area configuration includes: whether a cell in the area A is contained in the measurement result logs is related to the quality of the cell in the area A, but is unrelated to whether the first cell belongs to an area indicated by the first area configuration.

In one embodiment, the phrase of performing measurement result logging for a cell in the area A means including a result of measuring the cell in the area A in the measurement result logs.

Embodiment 7

Figure 7:
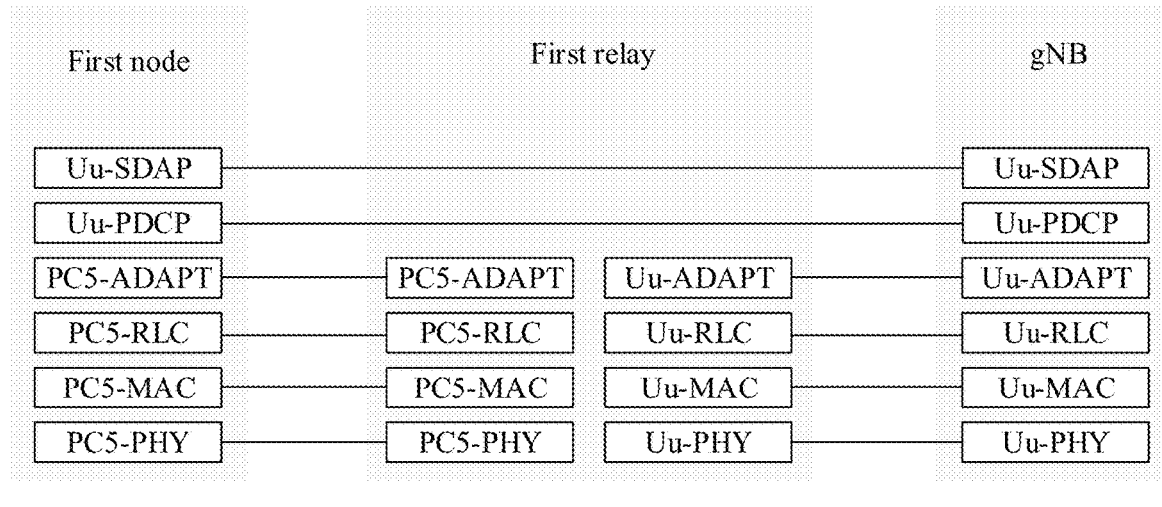
FIG. 7 illustrates a schematic diagram of a protocol stack of relay communications according to one embodiment of the present application.
Figure 7:
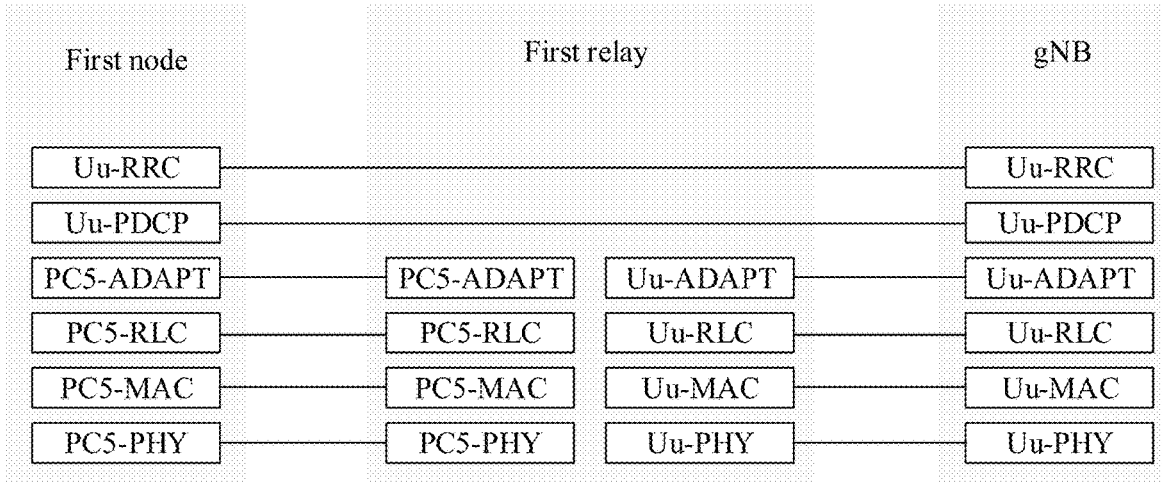

Embodiment 7 illustrates a schematic diagram of a protocol stack of relay communications according to one embodiment of the present application, as shown in FIG. 7.

The protocol stack shown in FIG. 7 is applicable to L2 U2N relay communications, with Embodiment 3 as the foundation of Embodiment 7.

Part (a) in FIG. 7 corresponds to a user plane protocol stack in L2 U2N relay communications; (b) in FIG. 7 corresponds to a control plane protocol stack in L2 U2N relay communications.

In Embodiment 7, a PC5 interface is an interface between the first node and the first relay, where protocol entities related to the PC5 interface {PC5-ADAPT, PC5-RLC, PC5-MAC, PC5-PHY} terminate at the first node and the first relay; a Uu interface is an interface between a UE and a gNB, where protocol entities of the Uu interface respectively terminate at the UE and the gNB.

In one embodiment, the first relay is a U2N relay UE, and before executing the first signaling, the first relay provides L2 U2N relay service to the first node.

In one embodiment, after executing the first signaling, the first relay no longer provides L2 U2N relay service to the first node.

In one embodiment, the first node and the first relay are UEs.

In one embodiment, the first relay shown in FIG. 7 corresponds to the third node U03 in Embodiment 5.

In one embodiment, the gNB shown in FIG. 7 corresponds to the second node in the present application.

In one embodiment, protocol entities of a Uu interface {Uu-ADAPT, Uu-RLC, Uu-MAC, Uu-PHY} terminate at the first relay and the gNB.

In one embodiment, as shown in (a), protocol entities of a Uu interface {Uu-SDAP, Uu-PDCP} terminate at the first node and the gNB; an SDAP PDU and a PDCP PDU of the first node are forwarded by the first relay, but the first relay does not modify the SDAP PDU and the PDCP PDU, which means that the SDAP PDU and the PDCP PDU transmitted to the gNB by the first node are transparent to the first relay.

In one embodiment, as shown in (b), protocol entities of a Uu interface {Uu-RRC, Uu-PDCP} terminate at the first node and the gNB; an RRC PDU and a PDCP PDU of the first node are forwarded by the first relay, but the first relay does not modify the RRC PDU and the PDCP PDU, which means that the RRC PDU and the PDCP PDU transmitted to the gNB by the first node are transparent to the first relay.

In one embodiment, as shown in (a), PC5-ADAPT corresponds to AP 358 in FIG. 3, PC5-RLC corresponds to RLC 353 in FIG. 3, PC5-MAC corresponds to MAC 352 in FIG. 3, and PC5-PHY corresponds to PHY 351 in FIG. 3.

In one embodiment, as shown in (a), Uu-SDAP corresponds to SDAP 356 in FIG. 3, and Uu-PDCP corresponds to PDCP 354 in FIG. 3.

In one embodiment, as shown in (b), PC5-ADAPT corresponds to AP 308 in FIG. 3, PC5-RLC corresponds to RLC 303 in FIG. 3, PC5-MAC corresponds to MAC 302 in FIG. 3, and PC5-PHY corresponds to PHY 301 in FIG. 3.

In one embodiment, as shown in (b), Uu-RRC corresponds to RRC 306 in FIG. 3, and Uu-PDCP corresponds to PDCP 304 in FIG. 3.

In one embodiment, a cell of the gNB in FIG. 7 is a serving cell of the first relay, the first relay being in a non-RRC connected state.

In one embodiment, a cell of the gNB in FIG. 7 is a PCell of the first relay, the first relay being in an RRC connected state.

In one embodiment, a cell of the gNB in FIG. 7 is a camped cell of the first relay.

In one embodiment, a cell of the gNB in FIG. 7 is a suitable cell of the first relay.

In one embodiment, a cell of the gNB in FIG. 7 is a cell selected by the first relay.

In one embodiment, a cell of the gNB in FIG. 7 is a camped cell of the first node.

In one embodiment, a cell of the gNB in FIG. 7 is a suitable cell of the first node.

In one embodiment, a cell of the gNB in FIG. 7 is a cell selected by the first node.

In one embodiment, a PC5-ADAPT is only used for a specific RB or message or specific data.

In one subembodiment, when the first relay forwards system information, the PC5-ADAPT layer is not used.

In one embodiment, as shown in FIG. 7, communications between the first node and the gNB use an indirect path.

In one embodiment, the first signaling is generated by Uu-RRC of the gNB given in FIG. 7(b) and received by Uu-RRC of the first node.

In one embodiment, the first signaling is transparent to the first relay.

In one embodiment, when using an indirect path, Uu-PDCP of the first node is associated with PC5-RLC, or is associated with PC5-RLC via PC5-ADAPT.

In one embodiment, when using a direct path, the first node will establish Uu-RLC, and Uu-PDCP of the first node is associated with the Uu-RLC.

In one subembodiment, after switching to the direct path, the first node releases PC5-RLC.

In one subembodiment, after switching to the direct path, the first node releases PC5-ADAPT.

In one subembodiment, after switching to the direct path, the first node releases PC5-MAC and PC5-PHY.

In one subembodiment, after switching to the direct path, the first node no longer uses PC5-ADAPT.

In one subembodiment, after switching to the direct path, there is no other protocol layer between Uu-PDCP and Uu-RLC of the first node.

Embodiment 8

Figure 8:
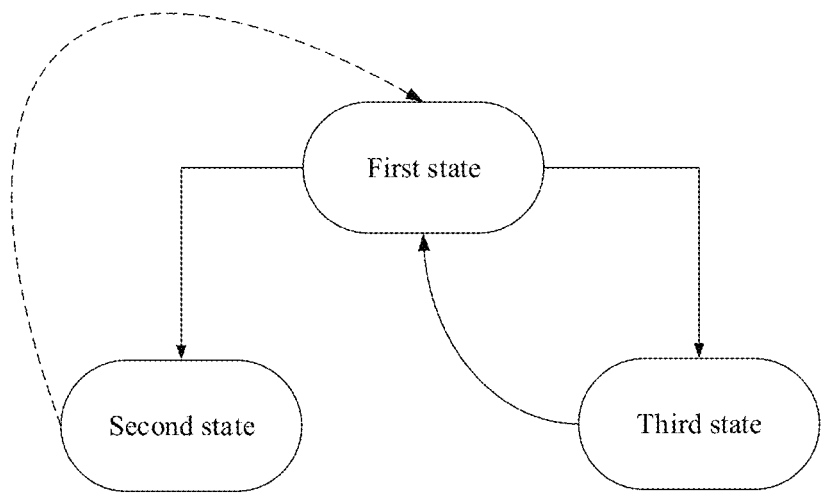
FIG. 8 illustrates a schematic diagram of state transition according to one embodiment of the present application.

Embodiment 8 illustrates a schematic diagram of state switching according to one embodiment of the present application, as shown in FIG. 8.

In FIG. 8, the dotted line indicates that the transition of state is optional, or the transition of state will have to go through another intermediate state, like cell selection and/or L2 U2N relay selection.

In one embodiment, the first state is being camped normally.

In one embodiment, the first state is not camped normally.

In one embodiment, the second state is a connected mode.

In one embodiment, the condition for entering the third state includes not finding any suitable cell or any suitable relay.

In one embodiment, the third state is any cell selection.

In one embodiment, as a response to finding a suitable relay, the third state is switched to the first state.

In one embodiment, both the first state and the third state are for non-RRC-connected state.

In one embodiment, after leaving from the second state the first node performs relay selection, once a suitable relay is found, the first node enters the first state.

In one embodiment, after leaving from the second state the first node performs cell selection, once a suitable cell is found, the first node enters the first state.

Embodiment 9

Figure 9:
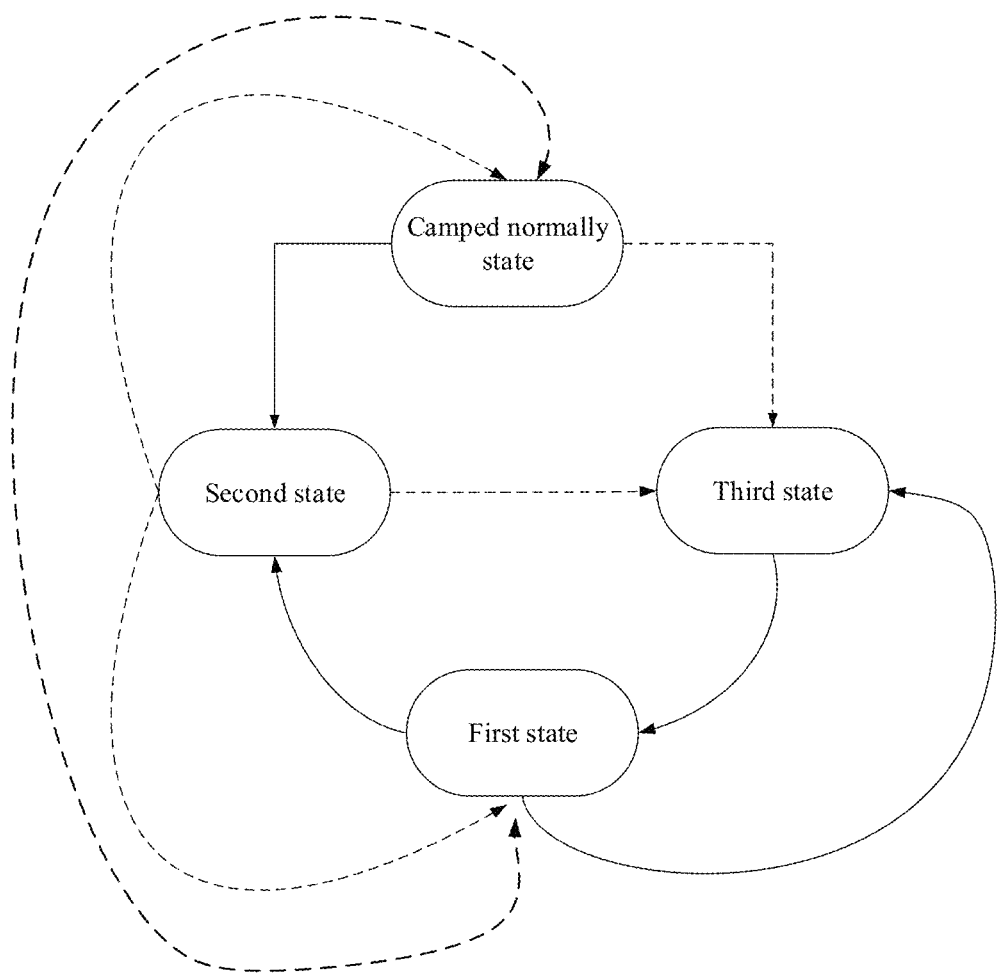
FIG. 9 illustrates a schematic diagram of state transition according to one embodiment of the present application.

Embodiment 9 illustrates a schematic diagram of state switching according to one embodiment of the present application, as shown in FIG. 9.

In FIG. 9, the dotted line indicates that the switch of state is optional, or the switch of state will have to go through another intermediate state, like cell selection and/or L2 U2N relay selection.

In one embodiment, the first state is not camped normally.

In one embodiment, the second state is a connected mode.

In one embodiment, the condition for entering the third state includes not finding any suitable cell or any suitable relay.

In one embodiment, the third state is any cell selection.

In one embodiment, as a response to finding a suitable relay, the third state is switched to the first state.

In one embodiment, both the first state and the third state are for non-RRC-connected state.

In one embodiment, as a response to finding a suitable cell, a first state is switched to a state of being camped normally.

In one embodiment, as a response to that quality of a suitable cell found is higher than a certain threshold and/or quality of the first relay is lower than a threshold, a first state is switched to a state of being camped normally.

In one embodiment, when any condition in the first transition condition set is satisfied, the first state is switched to the second state.

In one embodiment, the first candidate state is not a camped normally state.

In one embodiment, the first candidate state is a camped normally state.

In one embodiment, the second candidate state is not a camped normally state.

In one embodiment, the condition for entering the first state includes finding a suitable relay.

In one embodiment, the condition for entering a camped normally state includes finding a suitable cell.

Embodiment 10

Figure 10:
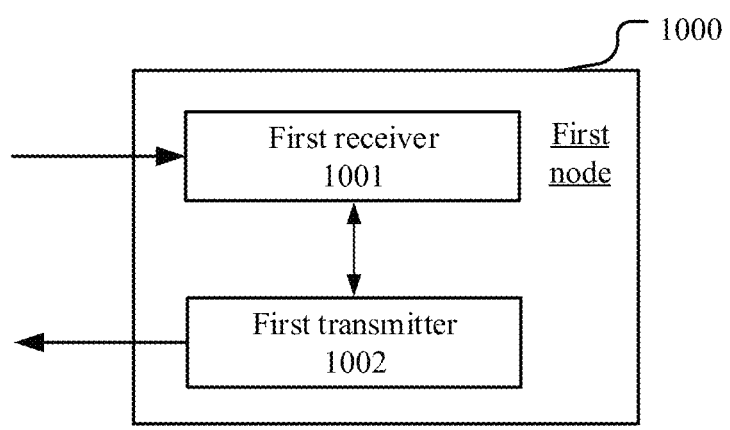
FIG. 10 illustrates a structure block diagram of a processing device in a first node according to one embodiment of the present application.

Embodiment 10 illustrates a structure block diagram of a processing device used in a first node according to one embodiment of the present application; as shown in FIG. 10. In FIG. 10, a processing device 1000 in the first node is comprised of a first receiver 1001 and a first transmitter 1002. In Embodiment 10, the first receiver 1001 receives a first measurement configuration, the first measurement configuration comprising a first area configuration;

the first receiver 1001, which is in a first state, performs a first operation set; and determines according to the first state whether to perform measurement result logging based on the first area configuration;

herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the first candidate state is a camped normally state, the first condition set comprising that quality of cell on which the first node is camped does not satisfy a first quality criterion.

In one embodiment, the first state set comprises a second candidate state; as a response to any condition in a second transition condition set being satisfied, the second candidate state can directly move to the connected mode; the second candidate state is a state other than being camped normally;
the phrase that the first state is used to determine whether to log measurement results based on the first area configuration includes: when the first state is the second candidate state, perform measurement result logging based on the first area configuration.

In one embodiment, the first state set comprises a second candidate state; as a response to any condition in a second transition condition set being satisfied, the second candidate state can directly move to the connected mode;
the phrase that the first state is used to determine whether to log measurement results based on the first area configuration includes: when the first state is the second candidate state, perform measurement result logging and the action of performing measurement result logging is unrelated to the first area configuration.

In one embodiment, the first state set comprises a second candidate state; as a response to any condition in a second transition condition set being satisfied, the second candidate state can directly move to the connected mode;
the phrase that the first state is used to determine whether to log measurement results based on the first area configuration includes: when the first state is the second candidate state, quality of a first cell is used to determine whether to perform measurement result logging based on the first area configuration;
herein, the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result logging is unrelated to the first area configuration.

In one embodiment, the first receiver 1001 starts a first timer as a response to receiving the first measurement configuration, where a value of the first timer is a first time length, the first measurement configuration comprising the first time length; and performs measurement result logging as a response to the first timer staying in a state of running.

In one embodiment, as indicated by the first measurement configuration, a report type is event-triggered, and an event type is outOfCoverage.

In one embodiment, the first receiver 1001 performs measurement result logging, and adds first information in the measurement result logs, the first information being used for indicating at least one of a first state, receiving network information via relay, being out of coverage of a first cell, or the first relay.

In one embodiment, the first receiver 1001 performs measurement result logging, and adding an identity of a first cell in the measurement result logs, the first cell belonging to an area indicated by the first area configuration;
herein, the first cell is a serving cell when the first relay is not in an RRC connected state or a Primary Cell (PCell) when the first relay is in an RRC connected state.

In one embodiment, the first transmitter 1002 transmits a first measurement report.

In one subembodiment, the first measurement report comprises at least partial information in the first measurement configuration.

In one subembodiment, the first measurement report is transmitted via sidelinkUEinformation.

In one subembodiment, the first measurement report is transmitted via UEinformationResponse.

In one embodiment, the first receiver 1001 receives a first measurement configuration, the first measurement configuration comprising a first identity list;
the first receiver, which is in a first state, performs a first operation set; and determines whether to perform measurement result logging according to the first identity list;
herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining whether to perform measurement result logging according to the first identity list includes: when the first identity list comprises an identity of the first relay, performing measurement result logging; or when the first identity list does not comprise an identity of the first relay, performing no measurement result logging.

In one subembodiment, the action of performing measurement result logging includes quality information of the sidelink.

In one subembodiment, the action of performing measurement result logging includes logging quality information of a serving cell of the first relay.

In one subembodiment, the action of performing measurement result logging includes logging an identity of the first relay.

In one subembodiment, the action of performing measurement result logging includes logging quality information of a serving cell of the first relay, and the quality of the serving cell of the first relay meets a first quality criterion.

In one subembodiment, the action of performing measurement result logging includes logging quality information of a serving cell of the first relay, and the quality of the serving cell of the first relay does not meet a first quality criterion.

In one subembodiment, any condition in a first condition set is satisfied.

In one subembodiment, no condition in a first condition set is satisfied.

In one subembodiment, the first state set only comprises the first candidate state.

In one subembodiment, the first state set comprises at least the first candidate state and the second candidate state.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a U2N remote UE.

In one embodiment, the first node is a cellphone.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a piece of equipment supporting transmissions with low delay and high reliability.

In one embodiment, the first node is a sidelink communication node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Figure 11:
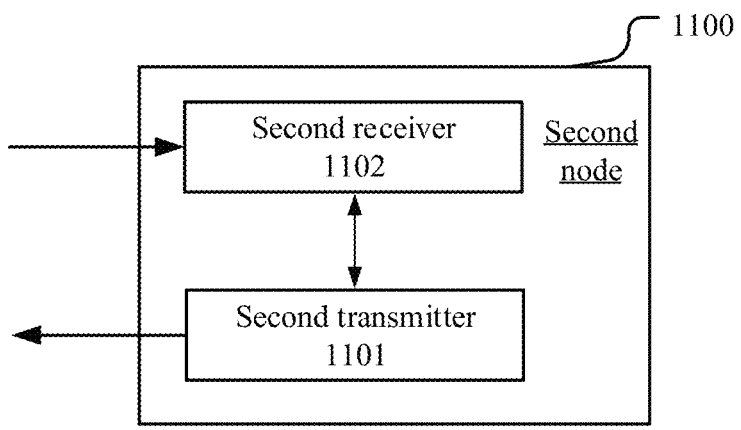
FIG. 11 illustrates a structure block diagram of a processing device in a second node according to one embodiment of the present application.

Embodiment 11 illustrates a structure block diagram of a processing device used in a second node according to one embodiment of the present application; as shown in FIG. 11. In FIG. 11, a processing device 1100 in the second node is comprised of a second transmitter 1101 and a second receiver 1102. In Embodiment 11, the second transmitter 1101 transmits a first measurement configuration, the first measurement configuration comprising a first area configuration;

a receiver of the first measurement configuration, which is in a first state, performing a first operation set; and determining according to the first state whether to perform measurement result logging based on the first area configuration;

herein, the first operation set comprises: receiving paging via a first relay, and acquiring a first system information set via the first relay, and performing re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

In one embodiment, the first candidate state is a camped normally state, the first condition set comprising that quality of cell on which the first node is camped does not satisfy a first quality criterion.

In one embodiment, the first state set comprises a second candidate state; as a response to any condition in a second transition condition set being satisfied, the second candidate state can directly move to the connected mode; the second candidate state is a state other than being camped normally;
the phrase that the first state is used to determine whether to log measurement results based on the first area configuration includes: when the first state is the second candidate state, perform measurement result logging based on the first area configuration.

In one embodiment, the first state set comprises a second candidate state; as a response to any condition in a second transition condition set being satisfied, the second candidate state can directly move to the connected mode;
the phrase that the first state is used to determine whether to log measurement results based on the first area configuration includes: when the first state is the second candidate state, perform measurement result logging and the action of performing measurement result logging is unrelated to the first area configuration.

In one embodiment, the first state set comprises a second candidate state; as a response to any condition in a second transition condition set being satisfied, the second candidate state can directly move to the connected mode;
the phrase that the first state is used to determine whether to log measurement results based on the first area configuration includes: when the first state is the second candidate state, quality of a first cell is used to determine whether to perform measurement result logging based on the first area configuration;
herein, the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result logging is unrelated to the first area configuration.

In one embodiment, the first measurement configuration is used for starting a first timer, where a value of the first timer is a first time length, the first measurement configuration comprising the first time length; a receiver of the first measurement configuration performs measurement result logging when the first timer is in a state of running.

In one embodiment, as indicated by the first measurement configuration, a report type is event-triggered, and an event type is outOfCoverage.

Specifically, receiving a measurement result, the measurement result including first information, the first information being used for indicating at least one of a first state, receiving network information via relay, being out of coverage of a first cell, or the first relay.

In one embodiment, receiving a measurement result, the measurement result including an identity of a first cell, the first cell belonging to an area indicated by the first area configuration;

herein, the first cell is a serving cell when the first relay is not in an RRC connected state or a Primary Cell (PCell) when the first relay is in an RRC connected state.

In one embodiment, receiving a measurement result, the measurement result including an identity of a first cell, the first cell not belonging to an area indicated by the first area configuration;

herein, the first cell is a serving cell when the first relay is not in an RRC connected state or a Primary Cell (PCell) when the first relay is in an RRC connected state.

In one embodiment, the second receiver 1102 receives a first measurement report;

In one embodiment, the second node is a satellite.

In one embodiment, the second node is an IoT node.

In one embodiment, the second node is a relay.

In one embodiment, the second node is a U2N relay UE.

In one embodiment, the second node is an access point.

In one embodiment, the second node is a base station.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
    a first receiver, receiving a first measurement configuration, the first measurement configuration comprising a first area configuration;
    the first receiver, which is in a first state, performing a first operation set; and determining according to the first state whether to perform measurement result logging based on the first area configuration;
    wherein the first operation set comprises: receiving paging via a first relay, and acquiring a first system information set via the first relay, and performing a re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

2. The first node according to claim 1, characterized in that the first candidate state is a camped normally state, the first condition set comprising that quality of cell on which the first node is camped does not satisfy a first quality criterion.

3. The first node according to claim 1, characterized in that
    the first state set comprises a second candidate state; as a response to any condition in a second transition condition set being satisfied, the second candidate state can directly move to the connected mode; the second candidate state is a state other than being camped normally;
    the phrase that the first state is used to determine whether to log measurement results based on the first area configuration includes: when the first state is the second candidate state, perform measurement result logging based on the first area configuration.

4. The first node according to claim 1, characterized in that
    the first state set comprises a second candidate state; as a response to any condition in a second transition condition set being satisfied, the second candidate state can directly move to the connected mode;
    the phrase that the first state is used to determine whether to log measurement results based on the first area configuration includes: when the first state is the second candidate state, perform measurement result logging and the action of performing measurement result logging is unrelated to the first area configuration.

5. The first node according to claim 1, characterized in that
    the first state set comprises a second candidate state; as a response to any condition in a second transition condition set being satisfied, the second candidate state can directly move to the connected mode;

the phrase that the first state is used to determine whether to log measurement results based on the first area configuration includes: when the first state is the second candidate state, quality of a first cell is used to determine whether to perform measurement result logging based on the first area configuration;

wherein the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result recoding is unrelated to the first regional configuration.

6. The first node according to claim 1, characterized in that the phrase that the first state is used to determine whether to log measurement results based on the first area configuration includes: quality of a first cell is used to determine whether to perform measurement result logging based on the first area configuration;

wherein the phrase that the quality of a first cell is used to determine whether to perform measurement result logging based on the first area configuration means that when the quality of the first cell satisfies a first quality criterion, perform measurement result logging based on the first area configuration, when the quality of the first cell does not satisfy the first quality criterion, performing measurement result recoding is unrelated to the first area configuration.

7. The first node according to claim 6, characterized in that the quality of the first cell does not satisfy a first quality criterion, so that the first node is out of coverage.

8. The first node according to any of claim 6, comprising:

the first receiver, starting a first timer as a response to receiving the first measurement configuration, where a value of the first timer is a first time length, the first measurement configuration comprising the first time length; and performing measurement result recoding as a response to the first timer being running.

9. The first node according to claim 8, characterized in that as indicated by the first measurement configuration, a report type is event triggered, and an event type is outOfCoverage.

10. The first node according to any of claim 6, comprising:

the first receiver, performing measurement result logging, and adding an identity of a first cell in the measurement result logs, the first cell belonging to a area indicated by the first area configuration;

wherein the first cell is a serving cell when the first relay is not in an RRC connected state or a Primary Cell (PCell) when the first relay is in an RRC connected state.

11. The first node according to claim 6, characterized in that the first measurement configuration is used for performing measurement result logging in an RRC_IDLE or RRC_INACTIVE state.

12. The first node according to claim 11, characterized in that the first condition set comprises connecting to the network via a Layer-2 UE to Network (L2 U2N) relay UE.

13. The first node according to claim 1, characterized in that as indicated by the first measurement configuration, a report type is event triggered, and an event type is outOfCoverage.

14. The first node according to claim 1, comprising:

the first receiver, performing measurement result logging, and adding first information in the measurement result logs, the first information being used for indicating at least one of a first state, receiving network information via relay, being out of coverage of a first cell, or the first relay.

15. The first node according to claim 1, comprising:

the first receiver, performing measurement result logging, and adding an identity of a first cell in the measurement result logs, the first cell belonging to a area indicated by the first area configuration;

wherein the first cell is a serving cell when the first relay is not in an RRC connected state or a Primary Cell (PCell) when the first relay is in an RRC connected state.

16. The first node according to claim 1, characterized in that the name of the first candidate state includes ooc or outofcoverage.

17. The first node according to claim 1, characterized in that the first candidate state is relay connected.

18. The first node according to claim 1, characterized in that the name of the first candidate state includes indirect.

19. A second node for wireless communications, comprising:

a second transmitter, transmitting a first measurement configuration, the first measurement configuration comprising a first area configuration;

a receiver of the first measurement configuration, performing a first operation set in a first state; and determining according to the first state whether to perform measurement result logging based on the first area configuration;

wherein the first operation set comprises: receiving paging via a first relay, and acquiring a first system information set via the first relay, and performing a re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

20. A method in a first node for wireless communications, comprising:
- receiving a first measurement configuration, the first measurement configuration comprising a first area configuration;
- performing a first operation set in a first state; and determining according to the first state whether to perform measurement result logging based on the first area configuration;
- wherein the first operation set comprises: receiving paging via a first relay, and acquiring a first system information set via the first relay, and performing a re-selection assessment; the first state is a state that isn't RRC connected; the first state belongs to a first state set, the first state set comprising at least a first candidate state; as a response to any condition in a first transition condition set being satisfied, the first candidate state can directly move to a connected mode; in the connected mode an RRC connection is established; the phrase of determining according to the first state whether to perform measurement result logging based on the first area configuration includes: when the first state is the first candidate state and any condition in a first condition set is satisfied, perform measurement result logging and the action of performing measurement result logging is unrelated to the first area configuration.

* * * * *